United States Patent
Pratt et al.

(10) Patent No.: US 11,657,086 B2
(45) Date of Patent: May 23, 2023

(54) ACOUSTIC MONITORING SYSTEM

(71) Applicant: AT&T Intellectual Property I, L.P., Atlanta, GA (US)

(72) Inventors: James H. Pratt, Round Rock, TX (US); Gregory Edwards, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 132 days.

(21) Appl. No.: 17/220,472

(22) Filed: Apr. 1, 2021

(65) Prior Publication Data
US 2021/0248183 A1 Aug. 12, 2021

Related U.S. Application Data

(63) Continuation of application No. 16/551,417, filed on Aug. 26, 2019, now Pat. No. 10,997,237, which is a (Continued)

(51) Int. Cl.
*G06F 16/683* (2019.01)
*B64C 39/02* (2023.01)
(Continued)

(52) U.S. Cl.
CPC .......... *G06F 16/683* (2019.01); *B64C 39/024* (2013.01); *G05D 1/005* (2013.01);
(Continued)

(58) Field of Classification Search
CPC .................................................... G06F 16/683
See application file for complete search history.

(56) References Cited

U.S. PATENT DOCUMENTS

| 4,818,990 A | 4/1989 | Fernandes |
| 6,122,572 A | 9/2000 | Yavnai |

(Continued)

FOREIGN PATENT DOCUMENTS

| EP | 1526353 B1 | 4/2005 |
| EP | 1942351 A1 | 7/2008 |

(Continued)

OTHER PUBLICATIONS

"Beyond Line of Sight Combat Identification (BLOS)," 2012, 2 Pages, SARA, sara.com.
(Continued)

*Primary Examiner* — Michael A Berns
(74) *Attorney, Agent, or Firm* — Amin, Turocy & Watson, LLP

(57) ABSTRACT

A monitored space is monitored including the production of a first audio signal from received acoustic energy. The first audio signal is then processed against a whitelist of acoustic profiles and, based on lack of substantial correspondence with any of the acoustic profiles, a drone is navigated toward an apparent position of an apparent source. While in-flight, additional acoustic energy is received and a second audio signal is produced from the additional acoustic energy. The second audio signal is processed against the whitelist and, based on lack of substantial correspondence with any of the acoustic profiles of the whitelist, an investigate mode of the drone is initiated. The investigate mode includes notifying a remote monitor and supplying the remote monitor with an audiovisual feed. Responsive to a characterization by the remote monitor, an entry of the whitelist may be updated, added or replaced.

20 Claims, 17 Drawing Sheets

Related U.S. Application Data continuation of application No. 15/478,877, filed on Apr. 4, 2017, now Pat. No. 10,394,239.

(51) Int. Cl.
  *G05D 1/00* (2006.01)
  *H04B 7/185* (2006.01)
  *G06F 16/61* (2019.01)

(52) U.S. Cl.
  CPC ......... *G05D 1/0088* (2013.01); *G05D 1/0094* (2013.01); *G06F 16/61* (2019.01); *H04B 7/18506* (2013.01); *B64C 2201/12* (2013.01); *B64C 2201/141* (2013.01)

(56) References Cited

U.S. PATENT DOCUMENTS

| | | | |
|---|---|---|---|
| 6,380,889 B1 | 4/2002 | Herrmann et al. | |
| 6,584,879 B2 | 7/2003 | Gorman | |
| 7,123,169 B2 | 10/2006 | Farmer et al. | |
| 7,548,488 B2 | 6/2009 | Horak et al. | |
| 7,551,519 B2 | 6/2009 | Slater | |
| 8,045,418 B2 | 10/2011 | Suzuki | |
| 8,589,994 B2 | 11/2013 | Monroe | |
| 8,643,538 B2 | 2/2014 | Schantz et al. | |
| 8,681,218 B1 | 3/2014 | Jensen et al. | |
| 8,930,044 B1 | 1/2015 | Peeters et al. | |
| 9,071,451 B2 | 6/2015 | Hall | |
| 9,373,014 B1 | 6/2016 | Mehranfar | |
| 9,392,570 B1 | 7/2016 | Zhang | |
| 9,430,189 B2 | 8/2016 | Soles et al. | |
| 9,505,494 B1 | 11/2016 | Marlow et al. | |
| 9,552,736 B2 | 1/2017 | Taveira | |
| 9,601,022 B2 | 3/2017 | Taveira | |
| 9,685,089 B2 * | 6/2017 | Paczan | G01S 5/18 |
| 10,249,199 B2 * | 4/2019 | Banga | H04W 12/086 |
| 10,362,392 B2 | 7/2019 | Alvord et al. | |
| 10,394,239 B2 * | 8/2019 | Pratt | G05D 1/005 |
| 10,997,237 B2 * | 5/2021 | Pratt | G05D 1/005 |
| 2010/0013917 A1 | 1/2010 | Hanna et al. | |
| 2012/0330499 A1 * | 12/2012 | Scheid | G01N 29/14 |
| | | | 701/29.6 |
| 2016/0117853 A1 | 4/2016 | Zhong et al. | |
| 2016/0124071 A1 | 5/2016 | Baxley et al. | |
| 2016/0198088 A1 | 7/2016 | Wang et al. | |
| 2016/0214715 A1 | 7/2016 | Meffert | |
| 2016/0216363 A1 | 7/2016 | Martin et al. | |
| 2017/0339487 A1 | 11/2017 | Alvord et al. | |
| 2018/0197420 A1 | 7/2018 | Banga | |

FOREIGN PATENT DOCUMENTS

| | | |
|---|---|---|
| EP | 2259589 A2 | 12/2010 |
| EP | 2671375 A1 | 12/2013 |
| FR | 2774474 A1 | 8/1999 |

OTHER PUBLICATIONS

"Acoustic Vector Sensors on Small Unmanned Air Vehicles," Nov. 2011, 8 Pages, Presented at the SMi Unmanned Aircraft Systems, UK.

"Multicopter Localization using Sound Landmarks," 2014, 2 Pages, Research Institute of Electrical Communication, Tohoku University.

"On-Board Relative Bearing Estimation for Teams of Drones Using Sound," IEEE Robotics and Automation Letters 1.2 (2016): pp. 820-827.

Joel Griffin, "Future of residential security tech on display at CES 2017," Jan. 6, 2017, 3 Pages, http://www.securityinfowatch.com/article/12292586/future-of-residential-security-tech-ondisplay-at-ces-2017.

Non Final office action received for U.S. Appl. No. 15/478,877 dated Dec. 10, 2018, 20 pages.

Notice of Allowance received for U.S. Appl. No. 16/551,417 dated Jan. 6, 2021, 29 pages.

* cited by examiner

ACOUSTIC MONITORING SYSTEM

RELATED APPLICATIONS

The subject patent application is a continuation of, and claims priority to each of, U.S. patent application Ser. No. 16/551,417, filed Aug. 26, 2019 (now U.S. Pat. No. 10,997,237), and entitled "ACOUSTIC MONITORING SYSTEM," which is a continuation of U.S. patent application Ser. No. 15/478,877, filed Apr. 4, 2017 (now U.S. Pat. No. 10,394,239), and entitled "ACOUSTIC MONITORING SYSTEM," which applications are hereby incorporated by reference herein in their respective entireties.

TECHNICAL FIELD

This disclosure relates generally to drones, such as unmanned aerial vehicles, and, more particularly, to acoustic-based monitoring with drones.

BACKGROUND

Drones, such as unmanned aerial vehicles (UAVs), are mobile platforms capable of acquiring (e.g., sensing) information, delivering goods, manipulating objects, etc., in many operating scenarios. Drones typically have the ability to travel to remote locations that are inaccessible to manned vehicles, locations that are dangerous to humans, or any other location. Upon reaching such locations, a suitably equipped drone may perform actions, such as acquiring sensor data (e.g., audio, images, video and/or other sensor data) at a target location, delivering goods (e.g., packages, medical supplies, food supplies, engineering materials, etc.) to the target location, manipulating objects (e.g., such as retrieving objects, operating equipment, repairing equipment etc.) at the target location, etc.

Drones are often controlled by a remote user from a command center (e.g., using a remote control, computer device, smart phone, and/or other remote monitor) such that the remote user provides commands to the drone through a wireless communications link to perform actions. More advanced drones are also being developed that are more autonomous (e.g., fully autonomous, semi-autonomous) such that drone guidance systems may assist the remote user or remove the need for the remote user altogether. However, more typically, a remote user and autonomous drone guidance systems will rely on a video feed to navigate the drone, which can provide a limited view of the environment in which the drone operates, especially in low-visibility situations (e.g., fog, rain, darkness, etc.). While autonomous and semi-autonomous drone navigation capabilities are expected to continue to mature, in many cases, autonomous and semi-autonomous drone guidance systems (and related sensors, computation systems and controls) need to be small/light enough and operate under limited power and resource constraints so as to allow the drone to remain nimble enough to travel quickly to, and potentially stay on station at, locations within a desired territory. In some cases and for some consumer-oriented deployment scenarios, practical considerations, including cost, may limit on-board sensors, storage, computation systems and controls.

BRIEF DESCRIPTION OF THE DRAWINGS

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
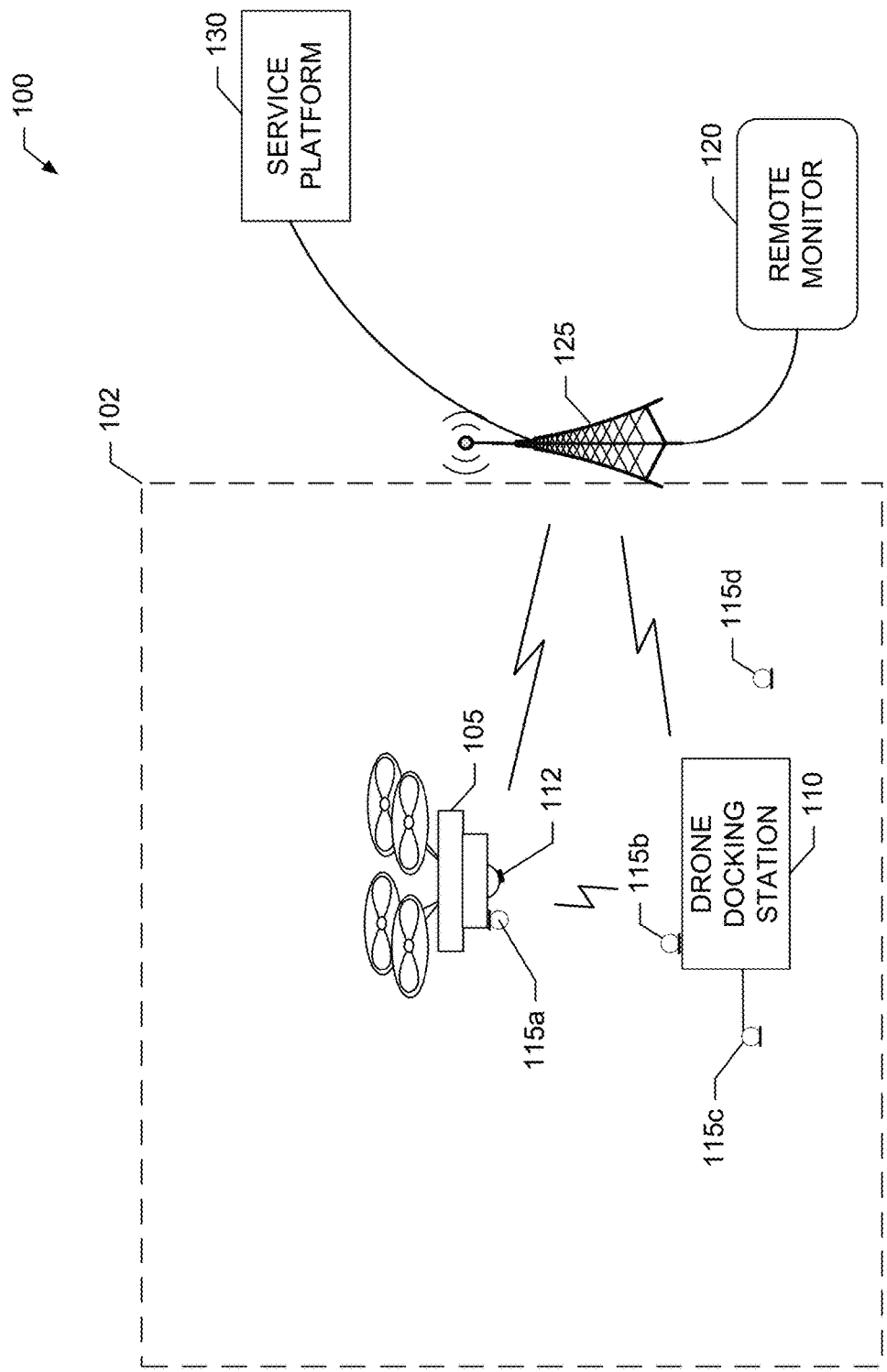
FIG. 1 is a schematic view illustrating an embodiment of an acoustic monitoring system.

Embodiments of the present disclosure include acoustic monitoring systems and methods that may be used to, for example, monitor a space for acoustic energy and autonomously navigate a drone to investigate an apparent source of the acoustic energy (e.g., a sound source, an object that reflect acoustic energy generated by another sound source, etc.). As discussed above, current drone guidance systems are typically controlled by a remote user. However, benefits of making a drone semi-autonomous or fully autonomous have been recognized such that some drone guidance systems include object-avoidance features but still require a remote user to guide the drone toward a specific location. Some issues with autonomous drones are that the autonomous features, such as sophisticated guidance systems, increase the weight and power requirements of the drone. Increased weight and power requirements may make the drone unusable for some use scenarios. Furthermore, the guidance systems of drones often rely on visual indications using cameras and/or other imaging sensors, and thus make the drone difficult and dangerous to use in low-visibility situations such as during storms, fog, night, and other situations. In addition, use scenarios where the drone is used to monitor a space, motion sensors and/or imaging sensors may not detect an event within the space due to an obstructed view of an object that caused the event. Therefore, it may be beneficial for a drone to be coupled with an acoustic monitoring system that includes a low-power, low-weight, directionally-discriminating acoustic sensor coupled to an acoustic analysis engine that automatically guides a drone toward an apparent source of the acoustic energy without requiring a remote user.

Navigation using acoustic sensors that capture and process acoustic energy from a monitored space improves a drone's autonomous mobility within that monitored space. Furthermore, acoustic profiles of an acoustic repository that identify sources of captured acoustic energy may be categorized such that the drone takes action or no action when an audio signal produced from captured acoustic energy substantially corresponds with an acoustic profile. When audio signals lack substantial correspondence with an acoustic profile, the drone may perform an investigation of the apparent source of acoustic energy to build its acoustic repository. A portion of the acoustic repository may be stored locally on the drone for quick access while another portion of the acoustic repository may be stored remote from the drone on a service platform such that the drone requires less hardware resources, which reduces weight and size. Thus, the drone may navigate itself based on what it 'hears,' which provides a light weight and energy efficient drone, enhanced autonomous controls, reduction in response time to initiate an action or alert, and controls for use in low-visibility situations when compared to drones that have autonomous capabilities based on visual data alone.

In some embodiments in accordance with the present disclosure, a monitoring method for use in a monitored space is disclosed. During the monitoring method, acoustic energy using a directionally-discriminating acoustic sensor may be received and the received acoustic energy from the received acoustic energy a first audio signal may be produced. The first audio signal may be computationally processed against a whitelist of acoustic profiles, and based on lack of substantial correspondence between the first audio signal and any of the acoustic profiles of the whitelist, a drone may be dispatched, the drone being in a standby mode immediately prior to the dispatching. The drone may be autonomously navigated toward an apparent position within the monitored space of an apparent source of the acoustic energy. While the drone is in-flight and using an on-board acoustic sensor, additional acoustic energy may be received from the apparent source and a second audio signal may be produced from the received acoustic energy. The second audio signal may be computationally processed against the whitelist and, based on continued lack of substantial correspondence with any of the acoustic profiles of the whitelist, an investigate mode of the drone may be initiated such that the drone notifies a remote monitor and supplies the remote monitor with an audiovisual feed from the drone via a wireless communications link. Responsive to a characterization received from the remote monitor, an entry of the whitelist may be updated, replaced, or added.

In various embodiments of the monitoring method for use in the monitored space, at least a portion of the whitelist may be stored at the drone as a local copy such that the updating, replacing, or adding is performed on the local copy and at least a portion of the whitelist may be maintained remote from the drone on a service platform accessible via the wireless communications link. In at least some modes of operation, the computational processing of the captured first or second audio signal against the whitelist includes communicating to the service platform, via the wireless communications link, an encoding of the captured first or second audio signal or one or more feature vectors computationally derived therefrom. An entry of a local portion of the whitelist stored at the drone may be added, updated or replaced based on substantial correspondence of the first or second audio signal with a whitelist entry maintained remote from the drone. A return of the drone to the standby mode may be initiated based on computational processing that determines that the second audio signal has substantial correspondence with a whitelist entry maintained remote from the drone.

In various embodiments of the monitoring method, the first audio signal may be computationally processed against a blacklist of acoustic profiles and based on substantial correspondence with any of the acoustic profiles of the blacklist, the drone may be dispatched and autonomously navigated from the monitoring or standby location toward the apparent position within the monitored space of the apparent source of the acoustic energy. In other various embodiments, on-board storage of the acoustic profiles on the drone may be initialized based on mission or operating parameters.

In some embodiments in accordance with the present disclosure, a monitoring system for use in a monitored space is disclosed. The monitoring system includes a directionally-discriminating acoustic sensor for producing audio signals, and a drone that includes on-board storage for at least a portion of a whitelist of acoustic profiles and an on-board processor configured to computationally evaluate correspondence of audio signals with acoustic profiles of the whitelist. The drone may be configured to respond to a first audio signal produced from received acoustic energy using the directionally-discriminating acoustic sensor such that the on-board processor of the drone, while the drone is in a standby mode, is configured to computationally process the first audio signal. Based on lack of substantial correspondence between the first audio signal and any of the acoustic profiles of the whitelist, the on-board processor causes the drone to exit the standby mode and autonomously navigate toward an apparent position within the monitored space of an apparent source of the acoustic energy. The drone may be further configured to, while in-flight and using on an on-board acoustic sensor, produce a second audio signal from additional received acoustic energy, computationally process the second audio signal against the whitelist and, based on lack of substantial correspondence with any of the acoustic profiles of the whitelist, initiate an investigate mode. During the investigate mode, the drone notifies a remote monitor and supplies the remote monitor with an audiovisual feed via a wireless communications link, and the drone may be configured to add, replace or update an entry of the whitelist responsive to a characterization from the remote monitor.

In various embodiments of the monitoring system for use in the monitored space, the directionally-discriminating acoustic sensor is or includes the on-board acoustic sensor. In various embodiments, at least a portion of the whitelist is stored remote from the drone on a service platform accessible via the wireless communications link, and in at least some modes of operation, the computational processing of a captured audio signal against the whitelist includes communicating to the service platform, via the wireless communications link, an encoding of, or feature vector computationally derived from, the captured audio signal. The drone may be further configured to add, update or replace an entry of the whitelist stored on-board the drone based on substantial correspondence of the first or second audio signal with a whitelist entry maintained remote from the drone. In various embodiments, the drone may be further configured to initiate a return to the standby mode based on a determination that the second audio signal has substantial correspondence with a whitelist entry maintained remote from the drone.

In various embodiments of the monitoring system, the drone is further configured to computationally process the first audio signal against a blacklist of acoustic profiles and, based on substantial correspondence with any of the acoustic profiles of the blacklist, dispatch and autonomously navigate toward the apparent position within the monitored space of the apparent source of the acoustic energy. In various embodiments of the monitoring system, the directionally-discriminating acoustic sensor is or includes the on-board acoustic sensor and the remote monitor includes one or more of a human operator at a remote location, and an automated system programmed to characterize the apparent source based statistical classifier, machine learning and/or signal processing techniques.

In some embodiments in accordance with the present disclosure, a monitoring method for use in a monitored space is disclosed. The monitoring method includes receiving acoustic energy using a directionally-discriminating acoustic sensor and producing a first audio signal from the acoustic energy. While in a standby mode, the first audio signal may be computationally processed to determine correspondence with stored acoustic profiles, such that the stored acoustic profiles include either or both of (i) include-type entries characteristic of sounds to be investigated and (ii) exclude-type entries characteristic of sounds to be ignored, and based on either or both of (i) substantial correspondence with any include-type entries or (ii) lack of substantial correspondence with each of the exclude-type entries, a drone may exit the standby mode and be dispatched and autonomously navigated toward an apparent position within the monitored space of an apparent source of the acoustic energy. While the drone is in-flight and using an on-board acoustic sensor, additional acoustic energy may be received from the apparent source and a second audio signal may be produced from the additional acoustic energy. The second audio signal may be computationally processed to determine correspondence with the stored acoustic profiles and based on either or both of (i) substantial correspondence with any of the include-type entries or (ii) lack of substantial correspondence with each of the exclude-type entries, initiates an investigate mode of the drone such that the drone notifies a remote monitor via a wireless communication link and supplies the remote monitor with an audiovisual feed. Responsive to a characterization received from the remote monitor, an include-type or exclude-type entry may be added, replaced, or updated to the stored acoustic profiles.

In various embodiments of the monitoring method, at least some of the acoustic profiles are stored on-board the drone and at least some of the acoustic profiles are maintained remote from the drone on a service platform accessible via the wireless communications link. In at least some modes of operation, the computational processing of the captured first and second audio signals against include- and exclude-type entries includes communicating to the service platform, via the wireless communications link, an encoding of the first or second audio signal or one or more feature vectors computationally derived therefrom.

In various embodiments of the monitoring method, the exclude-type entries constitute a whitelist and the include-type entries constitute a blacklist and the on-board storage of the acoustic profiles on the drone may be initialized based on mission or operating parameters and storage for the acoustic profiles may be managed on-board the drone as cache of recently relied upon include-type and exclude-type entries.

The systems and methods of the present disclosure provide for an acoustic monitoring system that includes a drone that can be dispatched and autonomously navigated to investigate a source of acoustic energy received by the acoustic monitoring system. As discussed below, the drone could be in a monitoring mode at a monitoring or standby location such as a drone docking station, a monitoring position, or on a patrol path within a monitored space. Acoustic energy from the monitored space may be received using an acoustic sensor such as a directionally-discriminating acoustic sensor, an array of acoustic sensors used to calculate time difference of arrival, and/or other acoustic sensor. The acoustic sensor may capture the acoustic energy as a first audio signal and the acoustic monitoring system may computationally process the first audio signal against a repository of acoustic profiles. An acoustic profile may be a digital summary of an audio signal such as an acoustic fingerprint that can be used to identify an audio sample of the audio signal. In various examples, the repository may include exclude-type entries (e.g., a whitelist of acoustic profiles) that are to be ignored when detected and/or include include-type entries (e.g., a blacklist of acoustic profiles) that are to be investigated when detected. At least a portion of the acoustic repository may be stored on the drone as a local copy, while at least a portion of the acoustic repository is maintained remote from the drone on a service platform accessible via a wireless communications link. Based on lack of substantial correspondence with any of the acoustic profiles of the whitelist or substantial correspondence with any of the acoustic profiles of the blacklist, the acoustic monitoring system causes a flight control unit of the drone to dispatch and autonomously navigate the drone that is in the monitoring mode from the monitoring or standby location toward an apparent position within the monitored space of an apparent source of the acoustic energy. While in-flight, the drone or other components of the acoustic monitoring system may receive additional acoustic energy using the sensor(s) and capture the additional acoustic energy received thereby as a second audio signal from the apparent source. The acoustic monitoring system may then computationally process the second audio signal against the acoustic repository and, based on substantial correspondence with the acoustic profile of the first audio signal and substantial correspondence with an acoustic profile of the whitelist, initiates a return of the drone to the monitoring mode. However, based on lack of substantial correspondence with any of the acoustic profiles of the whitelist or substantial correspondence with any of the acoustic profiles of the blacklist, the acoustic monitoring system may initiate an investigate mode of the drone.

The drone may also include an imaging sensor or other optical system. During the investigate mode, the system may use optical screen/filtering methods to computationally process an image against the whitelist and, based on substantial correspondence with any of visual profiles of the whitelist, initiate a return of the drone to the monitoring mode. The investigate mode may also include the drone notifying a remote monitor via the wireless communications link and thereafter supplying the remote monitor with an audio feed and/or a video feed (e.g., an audiovisual feed). The system may, responsive to a characterization by the remote monitor, add or update an entry of the whitelist or blacklist that includes the acoustic profile and the visual profile.

Referring now to FIG. 1, an embodiment of an acoustic monitoring system 100 is illustrated. In the illustrated embodiment, the acoustic monitoring system 100 includes a drone 105 provided in a monitored space 102. The monitored space 102 may be any indoor and/or outdoor or outside space that may be contiguous or non-contiguous. The monitored space 102 may be defined by geofencing techniques that may include specific geographic coordinates such as latitude, longitude, and/or altitude, and/or operate within a range defined by a wireless communication signal.

The drone 105 may be implemented by any type of drone, such as an unmanned aerial vehicle (UAV). In alternative embodiments, a robot, an unmanned vehicular device (e.g., land or water), and/or other vehicular device may be employed. In the illustrated examples of the present disclosure, the drone 105 is depicted as a UAV and includes a flight control unit and a payload unit. For example, the flight control unit of the drone 105 includes any appropriate avionics, control actuators, and/or other equipment to fly the drone. The payload unit of the drone 105 includes any equipment implementing features supported by the given drone. For example, the payload unit may include one or more sensors, such as one or more cameras and/or other imaging sensors 112, one or more environmental sensors (e.g., such as one or more temperature sensors, pressure sensors, humidity sensors, gas sensors, altitude sensors, location sensors and the like) and/or any other sensor. In the illustrated embodiment, the drone 105 may include an acoustic sensor 115a (e.g., a microphone, a microphone array, a directionally-discriminating acoustic sensor/transducer, and other acoustic sensors for detecting acoustic energy). Additionally or alternatively, an example payload unit for the drone 105 may include tools, actuators, manipulators, etc., capable of manipulating (e.g., touching, grasping, delivering, measuring, etc.) objects. Additionally or alternatively, an example payload unit for the drone 105 may include a portable base station, signal booster, signal repeater, etc., to provide network coverage to an area.

The acoustic monitoring system 100 may optionally include or be used in connection with a drone docking station 110 for drone launching, landing, and/or storing the drone 105. The drone docking station 110 may be located anywhere in the monitored space 102 such as a rooftop, a yard, a vehicle, or elsewhere. The drone docking station 110 may be connected to an external power grid and/or receive power from a local power source such as wind, solar, and/or thermal and store this power in one or more power supplies such as batteries. In certain embodiments, a battery of the drone 105 may be charged by the drone docking station 110 through a conduction pad and/or through an inductive charging device using the power of the drone docking station 110. The drone docking station 110 may include an acoustic sensor 115b as well as other sensors, such as one or more cameras and/or other imaging sensors, one or more environmental sensors described above, and/or other sensors. Furthermore, the drone docking station 110 may include an autonomous docking guidance system for guiding the drone 105 to dock with the drone docking station 110. For example, the drone docking station 110 may include at least one visual indicator (e.g., lights, reflectors) and/or acoustic indicators that are recognizable by the drone 105 to assist the drone 105 in docking with the drone docking station 110.

The drone 105 and the drone docking station 110 may include communication units having one or more transceivers to enable the drone 105 to communicate with the drone docking station 110, one or more sensors (e.g., acoustic sensors 115c and 115d) in the monitored space 102, a remote monitor 120, a service platform 130, and/or to communicate among other drones. Accordingly, and as disclosed in further detail below, the remote monitor 120 may be in communication with the drone 105 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the drone 105 and/or the drone docking station 110 in the acoustic monitoring system 100 of FIG. 1 include first (e.g., long-range) transceiver(s) to permit the drone 105 and/or the drone docking station 110 to communicate with a communication network 125. The communication network 125 may be implemented by an example mobile cellular network, such as a long term evolution (LTE) network or other third generation (3G), fourth generation (4G) wireless network, or fifth-generation (5G) wireless network. However, in some examples, the communication network 125 may be additionally or alternatively be implemented by one or more other communication networks, such as, but not limited to, a satellite communication network, a microwave radio network, and/or other communication networks. In other examples, the drone docking station 110 may maintain a network connection through a wired (e.g., Ethernet) connection.

The drone 105 and the drone docking station 110 additionally or alternatively may include second (e.g., short-range) transceiver(s) to permit the drone 105 and/or the drone docking station 110 to communicate with each other, acoustic sensors 115c-d, other drones and/or other drone docking stations. In the illustrated example of FIG. 1, such second transceivers are implemented by a type of transceiver supporting short-range wireless networking. For examples, such second transceivers may be implemented by Wi-Fi transceivers, Bluetooth® transceivers, infrared (IR) transceiver, and other transceivers that are configured to allow the drone 105 and/or the drone docking station 110 to intercommunicate via an ad-hoc or other wireless network.

The acoustic monitoring system 100 also includes or may be used in connection with a remote monitor 120. The remote monitor 120 may be provided by a desktop computing system, a laptop/notebook computing system, a tablet computing system, a mobile phone, a set-top box, a remote control, a wearable device, and implantable device, and/or other remote monitor for controlling drones. The remote monitor 120 may be responsible for managing the drone 105 deployed in the monitored space 102. For example, the remote monitor 120 may communicate directly through the communication network 125 and/or indirectly through the drone docking station 110 to locate the drone 105 in the monitored space 102, identify the drone 105 in the monitored space 102, ascertain capabilities of the drone 105 in the monitored space 102, monitor the operating status of the drone 105 in the monitored space 102, receive sensor data provided by the drone 105 in the monitored space 102, provide instructions to the drone 105, and/or provide other functionality.

The acoustic monitoring system 100 also includes or may be in connection with a service platform 130. For example, the service platform 130 may include one or more server devices, storage systems, cloud computing systems, and/or other computing devices (e.g., desktop computing device(s), laptop/notebook computing device(s), tablet computing device(s), mobile phone(s), etc.). As discussed below, the service platform 130 may be configured to provide repositories such an acoustic repository of acoustic profiles. For example the acoustic repository may include exclude-type entries (e.g., a whitelist of acoustic profiles), include-type entries (e.g., a blacklist of acoustic profiles), and/or other repositories of acoustic profiles that are based on audio signals and associated identifiers of apparent sources of the acoustic energy that provide (e.g., generated, reflected, transmitted, produced) acoustic energy that generate audio signals. In some embodiments, the service platform 130 may include an image repository of visual profiles, discussed further below, that may be associated with the identifiers of the apparent sources of the acoustic energy. Also, as discussed below, the service platform 130 may be configured to provide an acoustic analysis engine that determines whether a captured audio signal has substantial correspondence with an acoustic profile stored on the service platform 130. In addition, the service platform 130 may be configured to provide an image analysis engine that determines whether a captured image has substantial correspondence with a visual profile stored on the service platform 130.

Figure 2:
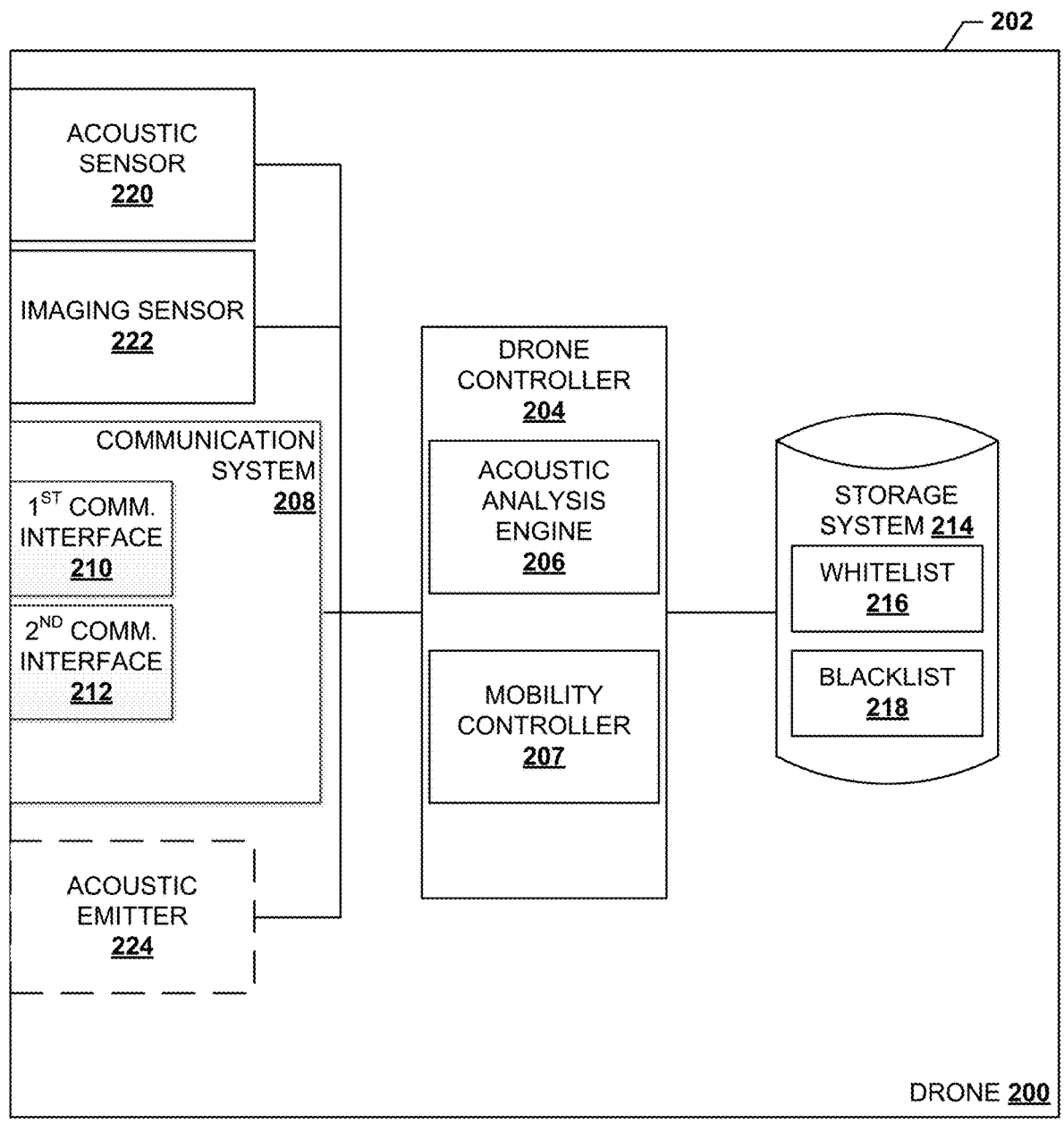
FIG. 2 is a schematic view illustrating an embodiment of a drone used in the acoustic monitoring system of FIG. 1.

Referring now to FIG. 2, an embodiment of a drone 200 is illustrated that may be the drone 105 discussed above with reference to FIG. 1, and which may be provided by a UAV, a robot, an unmanned vehicular device (e.g., land or water), and/or other vehicular device. In the illustrated embodiment, the drone 200 includes a chassis 202 that houses the components of the drone 200. Several of these components are illustrated in FIG. 2. For example, the chassis 202 may house a processing system (not illustrated) and a non-transitory memory system (not illustrated) that includes instructions that, when executed by the processing system, cause the processing system to provide a drone controller 204 that is configured to perform the functions of the drone controllers and/or the drones discussed below. In the specific example illustrated in FIG. 2, the drone controller 204 is configured to provide an acoustic analysis engine 206 that performs apparent source of the acoustic energy identification and location functionality as well as the functionality discussed below. In the specific example illustrated in FIG. 2, the drone controller 204 is also configured to provide a mobility controller 207 to control the example flight control unit of drone 105 and to implement any control and feedback operations appropriate for interacting with avionics, control actuators, and/or other equipment included in the flight control unit to navigate the drone 105 illustrated in FIG. 1.

The chassis 202 may further house a communication system 208 that is coupled to the drone controller 204 (e.g., via a coupling between the communication system 208 and the processing system). The communication system 208 may include software or instructions that are stored on a computer-readable medium and that allow the drone 200 to send and receive information through the communication networks discussed above. For example, the communication system 208 may include a first communication interface 210 to provide for communications through the communication network 125 as detailed above (e.g., first (e.g., long-range) transceiver(s)). In an embodiment, the first communication interface 210 may be a wireless antenna that is configured to provide communications with IEEE 802.11 protocols (Wi-Fi), cellular communications, satellite communications, other microwave radio communications and/or communications. The communication system 208 may also include a second communication interface 212 that is configured to provide direct communication with other drones, the drone docking station 110, acoustic sensors 115, monitors, and/or other devices within the monitored space 102 discussed above with respect to FIG. 1 (e.g., second (e.g., short-range) transceiver(s)). For example, the second communication interface 212 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may also house a storage system 214 that is coupled to the drone controller 204 through the processing system. The storage system 214 may store acoustic profiles in one or more repositories such as a whitelist 216 and/or a blacklist 218. The acoustic profiles may be a composite of a plurality of audio signals that are captured from acoustic energy generated by an apparent source of the acoustic energy (e.g., a car horn, a car engine, an animal's or human's vocal cords, an object that reflects acoustic energy, and/or any other apparent source that can produce, generate, and/or reflect acoustic energy). Furthermore, the acoustic profiles may be associated with an apparent source identifier that identifies the apparent source. In addition, each acoustic profile may be associated with one or more instructions to provide to the drone controller 204 and/or mobility controller 207 to control the drone 200 based on that acoustic profile having substantial correspondence with a captured audio signal.

In another example, one or more instructions may be associated with the type of repository (e.g., the whitelist 216 and the blacklist 218) in which an acoustic profile is stored. For example, if a first audio signal has substantial correspondence with an acoustic profile on the whitelist, a first instruction will be provided to the drone controller 204. If a second audio signal has substantial correspondence with an acoustic profile on the whitelist, the first instruction may be provided to the drone controller 204. Alternatively, if the first audio signal or the second audio signal has substantial correspondence with an acoustic profile of the blacklist 218, a second instruction may be provided to the drone controller 204. If the first audio signal or the captured second audio signal lack substantial correspondence with both the whitelist 216 and the blacklist 218, then a third instruction may be provided to the drone controller 204.

The chassis 202 may also house an on-board acoustic sensor 220 (e.g., a microphone, a microphone array, a directionally-discriminating acoustic sensor, or other acoustic sensors), an on-board imaging sensor 222 (e.g., a two-dimensional image capturing camera, a three-dimensional image capturing camera, an infrared image capturing camera, a depth capturing camera, similar video recorders, and/or a variety of other image or data capturing devices), and in some embodiments, an acoustic emitter 224. For example, the acoustic sensor 220 may include an microphone array that is configured to capture audio signals from acoustic energy in a monitored space and provide the audio signals to the acoustic analysis engine 206 to computationally process the audio signals against acoustic profiles stored in the storage system 214 to determine whether substantial correspondence with any of the acoustic profiles exists. The acoustic sensor 220 may also be used to determine an apparent direction and/or location of the apparent source that provided the acoustic energy as discussed further below. Similarly, the acoustic emitter 224 may include a speaker array or other sound emitting device that generates and emits acoustic energy to the monitored space such that the acoustic energy is reflected off objects within the monitored space. Those objects then become apparent sources of the acoustic energy that provide unique reflected acoustic energy back to the acoustic sensor 220. The imaging sensor 222 may be a camera and/or any other sensor device that may be used to gather visual information from the monitored space surrounding the drone 200 for use in identifying an apparent source.

Figure 3:
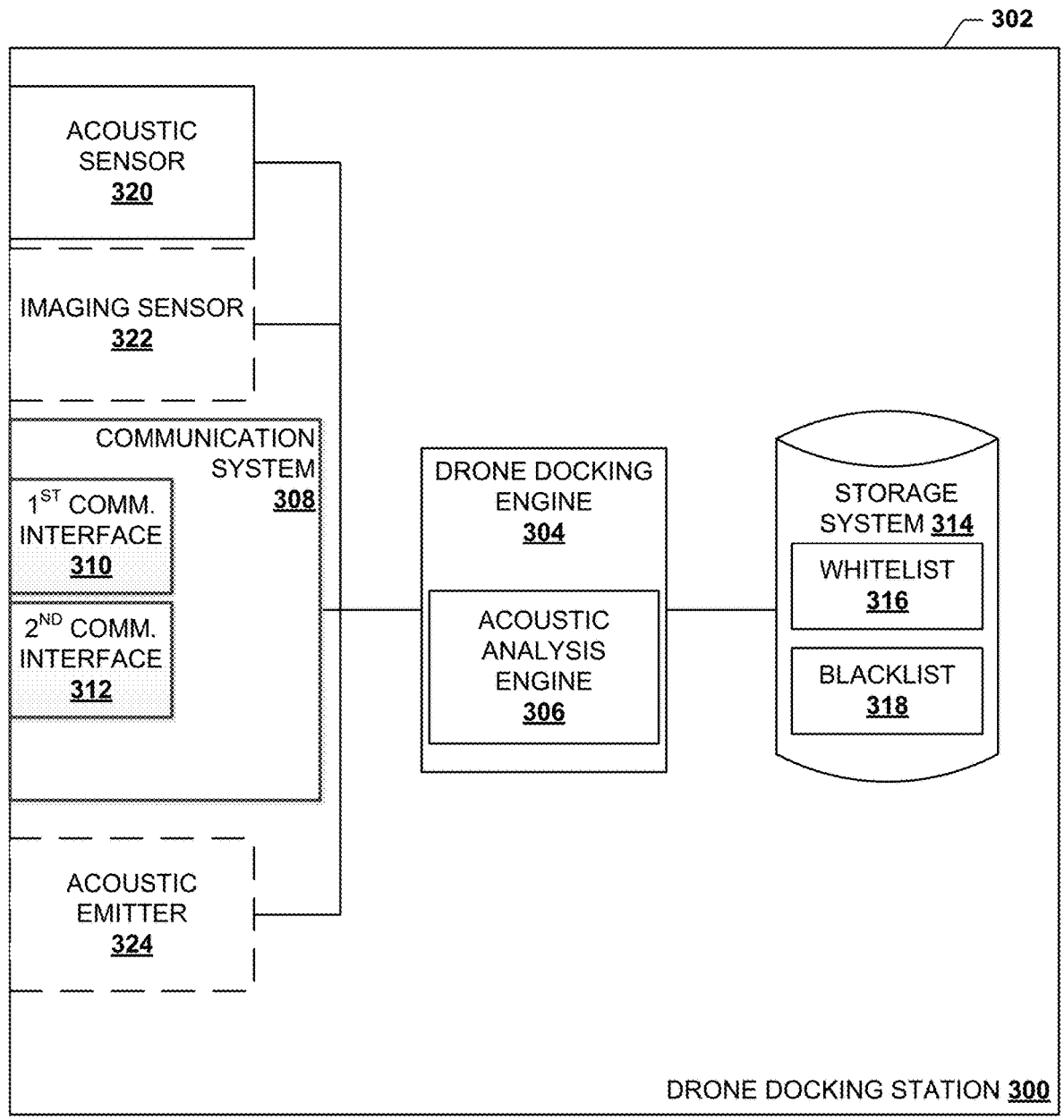
FIG. 3 is a schematic view illustrating an embodiment of a drone docking station used in the acoustic monitoring system of FIG. 1.

Referring now to FIG. 3, an embodiment of a drone docking station 300 is illustrated that may be the drone docking station 110 discussed above with reference to FIG. 1. In the illustrated embodiment, the drone docking station 300 includes a chassis 302 that houses the components of the drone docking station 300. Several of these components are illustrated in FIG. 3. For example, the chassis 302 may house a processing system (not illustrated) and a non-transitory memory system (not illustrated) that includes instructions that, when executed by the processing system, cause the processing system to provide a drone docking engine 304 that is configured to perform the functions of the drone docking engines and/or the drone docking stations discussed below. In the specific example illustrated in FIG. 3, the drone docking engine 304 is configured to provide an acoustic analysis engine 306 that performs apparent source identification and location determination functionality as well as the functionality discussed below.

The chassis 302 may further house a communication system 308 that is coupled to the drone docking engine 304 (e.g., via a coupling between the communication system 308 and the processing system). The communication system 308 may include software or instructions that are stored on a computer-readable medium and that allow the drone docking station 300 to send and receive information through the communication networks discussed above. For example, the communication system 308 may include a first communication interface 310 to provide for communications through the communication network 125 as detailed above (e.g., first (e.g., long-range) transceiver(s)). In a specific example, the first communication interface 310 may be a wireless antenna that is configured to provide communications with IEEE 802.11 protocols (Wi-Fi), cellular communications, satellite communications, other microwave radio communications and/or communications. In other examples, the first communication interface 310 may provide wired communications (e.g., Ethernet protocol) from the drone docking station 300 through the communication network 125. The communication system 308 may also include a second communication interface 312 that is configured to provide direct communication with the drone 105, other drone docking stations, acoustic sensors 115c and 115d, monitors, and/or other devices within the monitored space 102 discussed above with reference to FIG. 1 (e.g., second (e.g., short-range) transceiver(s)). For example, the second communication interface 312 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 302 may also house a storage system 314 that is coupled to the drone docking engine 304 through the processing system and that is configured to store the rules and/or other data utilized by the drone docking engine 304 to provide the functionality discussed below. For example, the storage system 314 may store acoustic profiles in one or more repositories such as an exclude-type repository (e.g., a whitelist 316) and/or an include-type repository (e.g., a blacklist 318) similar to the whitelist 216 and/or blacklist 218 discussed above with reference to FIG. 2. However, the whitelist 316 and/or the blacklist 318 may store at least one different acoustic profile than the whitelist 216 and/or the blacklist 218 of the drone 200. In other examples, the whitelist 316 and/or the blacklist 318 may store the same or a portion of the same acoustic profiles as the whitelist 216 and/or the blacklist 218. As such the acoustic profiles may be associated with one or more apparent source identifiers and one or more instructions to provide to the drone docking engine 304 and/or the mobility controller 207 of the drone 200 to control the drone 200.

The chassis 302 may also house an acoustic sensor 320 (e.g., a microphone, a microphone array, a directionally-discriminating acoustic sensor, and other acoustic sensors), an imaging sensor 322 (e.g., a two-dimensional image capturing camera, a three-dimensional image capturing camera, an infrared image capturing camera, a depth capturing camera, similar video recorders, and/or a variety of other image or data capturing devices), and in some embodiments, an acoustic emitter 324. For example, the acoustic sensor 320 may include an microphone array that is configured to capture audio signals from acoustic energy in a monitored space and provide the audio signals to the acoustic analysis engine 306 to computationally process the audio signal against acoustic profiles stored in the storage system 314 to determine whether substantial correspondence with any of the acoustic profiles exists. The acoustic sensor 320 may also be used to determine an apparent direction and/or location of the apparent source that provided the acoustic energy as discussed further below. Similarly, the acoustic emitter 324 may include a speaker array or other sound emitting device that generates and emits acoustic energy to the monitored space such that the acoustic energy is reflected off objects within the monitored space. Those objects then become apparent sources of the acoustic energy that provide unique reflected acoustic energy back to the acoustic sensor 320. The imaging sensor 322 may be a camera and/or any other sensor device that may be used to gather visual information from the monitored space surrounding the drone docking station 300 for use in identifying an apparent source.

Figure 4:
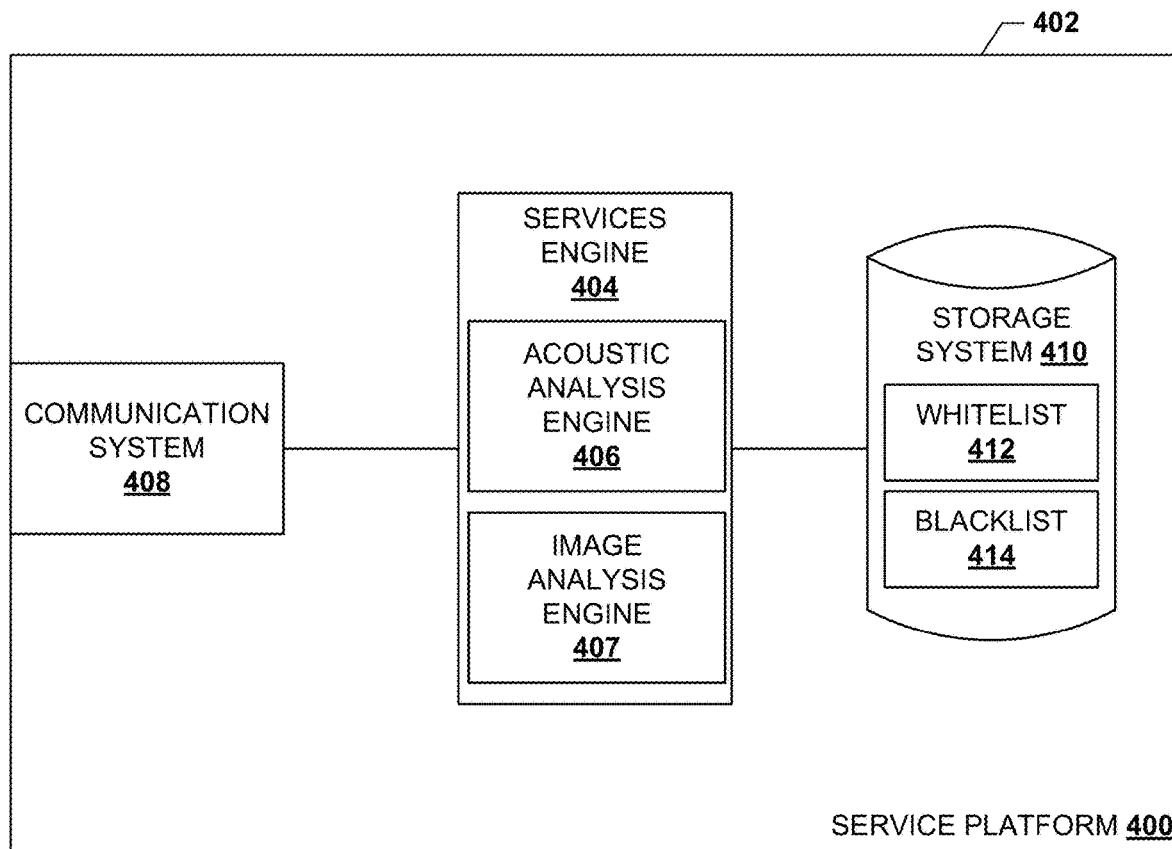
FIG. 4 is a schematic view illustrating an embodiment of a service platform used in the acoustic monitoring system of FIG. 1.

Referring now to FIG. 4, an embodiment of a service platform 400 is illustrated that may be the service platform 130 discussed above with reference to FIG. 1. In the illustrated embodiment, the service platform 400 includes a chassis 402 that houses the components of the service platform 400, only some of which are illustrated in FIG. 4. For example, the chassis 402 may house a processing system (not illustrated) and a non-transitory memory system (not illustrated) that includes instructions that, when executed by the processing system, cause the processing system to provide a services engine 404 that is configured to perform the functions of the services engines and/or service provider devices discussed below. In the specific example illustrated in FIG. 4, the services engine 404 is configured to provide an acoustic analysis engine 406 that performs apparent source identification as well as the functionality discussed below as well as an image analysis engine 407 that performs apparent source identification as well as the functionality discussed below.

The chassis 402 may further house a communication system 408 that is coupled to the services engine 404 (e.g., via a coupling between the communication system 408 and the processing system) and that is configured to provide for communication through the network as detailed below. The communication system 408 may allow the service platform 400 to send and receive information over the communication network 125 of FIG. 1. The chassis 402 may also house a storage system 410 that is coupled to the services engine 404 through the processing system and that is configured to store the rules and/or other data utilized by the services engine 404 to provide the functionality discussed below. For example, the storage system 410 may store acoustic profiles in one or more repositories such as an exclude-type repository (e.g., a whitelist 412) and/or an include-type repository (e.g., a blacklist 414) similar to the whitelists 216/316 and/or blacklists 218/318 discussed above with reference to FIG. 2 and FIG. 3. However, the whitelist 412 and/or the blacklist 414 may store at least one different acoustic profile than the whitelists 216/316 and/or the blacklists 218/318. In other examples, the whitelist 412 and/or the blacklist 414 may store a portion of the same acoustic profiles as the whitelists 216/316 and/or the blacklists 218/318. As such, the acoustic profiles may be associated with one or more apparent source identifiers and one or more instructions to provide through the communication network 125 to the drone docking engine 304 of FIG. 3 and/or the drone controller 204 of the drone 200 of FIG. 200 to control the drone 200. In addition, the storage system 410 may store visual profiles in one or more repositories such as the whitelist 412 and or the blacklist 414 that may be associated with a corresponding acoustic profile and apparent source identifier. While the storage system 410 has been illustrated as housed in the chassis 402 of the service platform 400, one of skill in the art will recognize that the storage system 410 may be connected to the services engine 404 through the communication network 125 via the communication system 408 without departing from the scope of the present disclosure.

Figure 5:
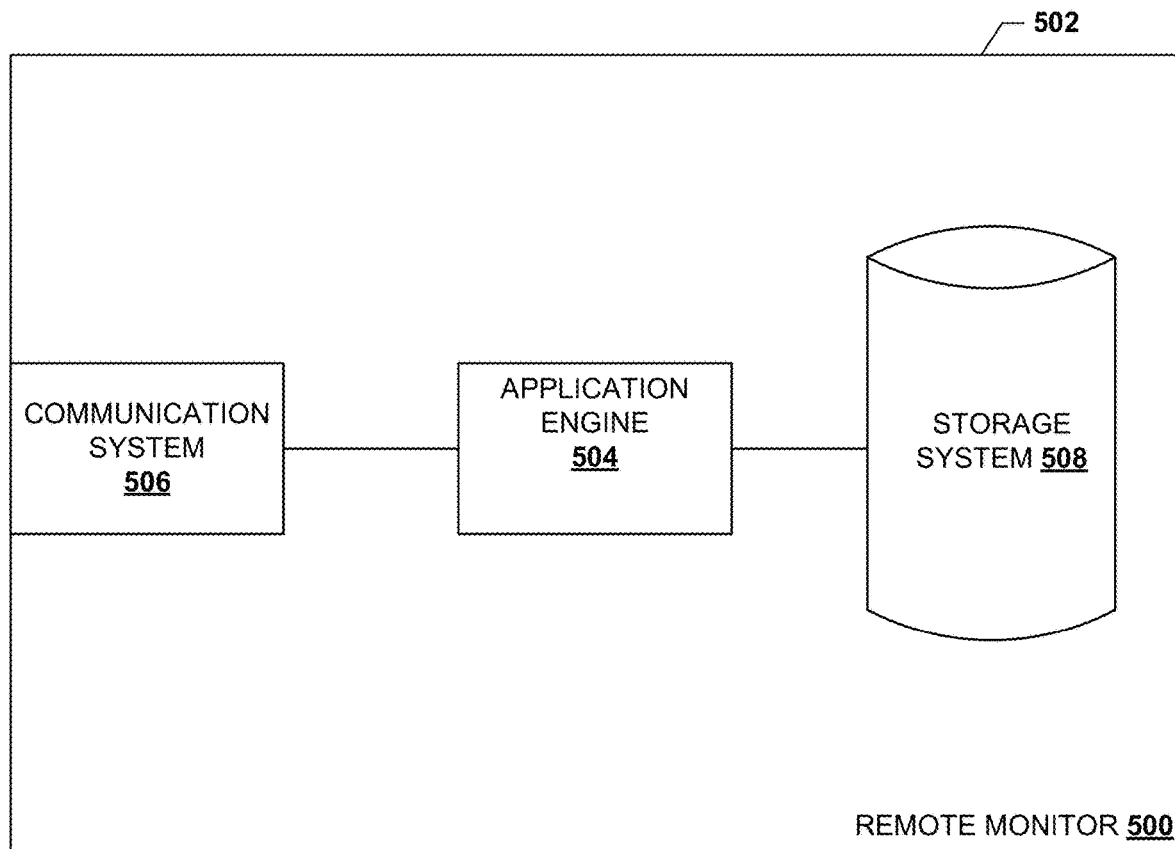
FIG. 5 is a schematic view illustrating an embodiment of a remote monitor used in the acoustic monitoring system of FIG. 1.

Referring now to FIG. 5 an embodiment of a remote monitor 500 is illustrated that may be the remote monitor 120 discussed above with reference to FIG. 1. In the illustrated embodiment, the remote monitor 500 includes a chassis 502 that houses the components of the remote monitor 500. Several of these components are illustrated in FIG. 5. For example, the chassis 502 may house a processing system (not illustrated) and a non-transitory memory system (not illustrated) that includes instructions that, when executed by the processing system, cause the processing system to provide an application engine 504 that is configured to perform the functions of the application engines, drone applications, and/or remote monitors discussed below. In the specific example illustrated in FIG. 5, the application engine 504 is configured to receive notifications from a drone and/or drone docking station that include audio feeds and video feeds, provide those notifications to an user through a drone application, receive instructions from the user through the drone application, and provide those instructions over a communication network to the drone and/or drone docking station as well as the functionality discussed below.

The chassis 502 may further house a communication system 506 that is coupled to the services engine 404 (e.g., via a coupling between the communication system 506 and the processing system) and that is configured to provide for communication through the network as detailed below. The communication system 506 may allow the remote monitor 500 to send and receive information over the communication network 125 of FIG. 1. The chassis 502 may also house a storage system 508 that is coupled to the application engine 504 through the processing system that is configured to store the rules, graphics, and/or other data utilized by the application engine 504 to provide the functionality discussed below. While the storage system 508 has been illustrated as housed in the chassis 502 of the remote monitor 500, one of skill in the art will recognize that the storage system 508 may be connected to the application engine 504 through the communication network 125 via the communication system 506 without departing from the scope of the present disclosure.

Figure 6A:
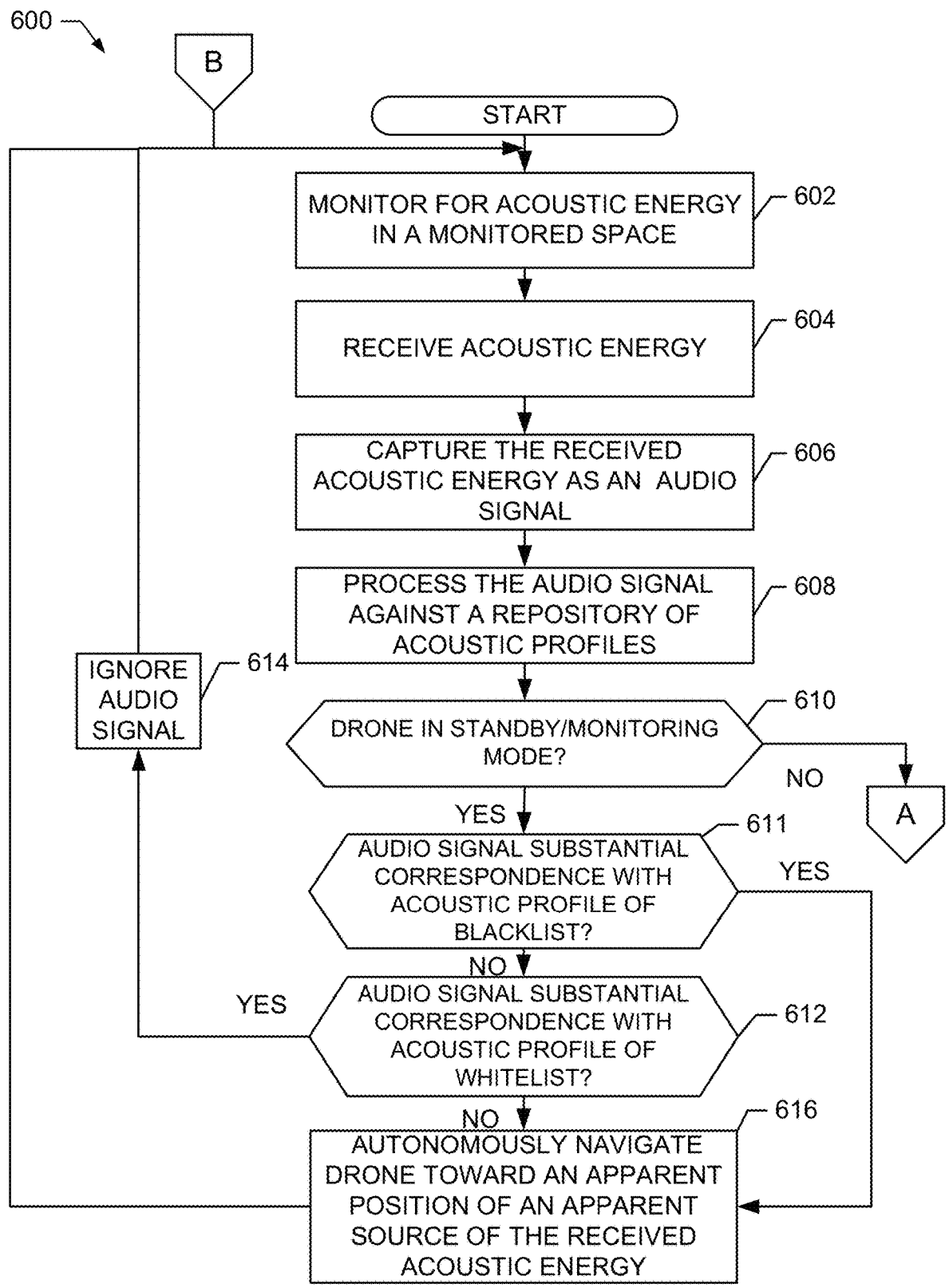
FIG. 6A is a flow chart illustrating an embodiment of a method for acoustic monitoring.
Figure 6B:
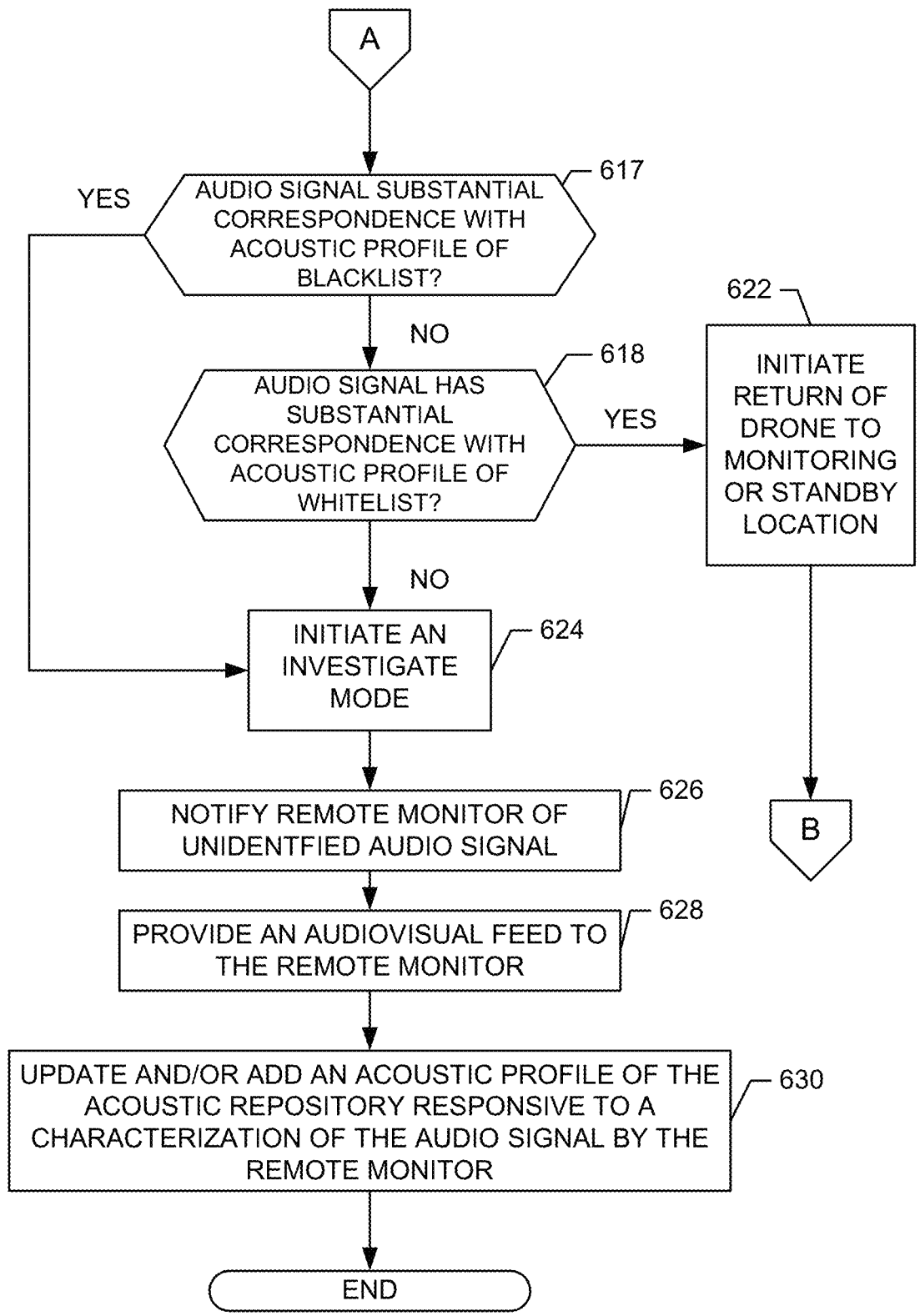
FIG. 6B is a continuation of the flow chart of FIG. 6A illustrating an embodiment of the method for acoustic monitoring.

Referring now to FIG. 6A and FIG. 6B, an embodiment of a method 600 for acoustic monitoring is illustrated. As discussed below, the systems and methods of the present disclosure provide an acoustic monitoring system that includes a drone and optionally a drone docking station that monitors for acoustic energy in a monitored space. The acoustic monitoring system computationally processes any audio signals that are derived from received acoustic energy to determine whether any of those audio signals have substantial correspondence to acoustic profiles stored in an acoustic repository (e.g., a whitelist or a blacklist) that is stored locally at the drone and/or drone docking station and remotely at a service platform coupled to the drone and/or drone docking station through a communication network. In response, to an audio signal's substantial correspondence with an acoustic profile or lack of substantial correspondence, instruction is provided to the drone. For example, if the captured audio signal lacks substantial correspondence to an acoustic profile on the whitelist, the acoustic monitoring system may instruct a drone to investigate acoustic energy by dispatching the drone from its drone docking station and/or from a monitoring position while in a monitoring mode to the apparent position of the apparent source that provided the acoustic energy. The drone may be configured to capture additional audio signals from the monitored space while in-flight, which may cause the drone to return to its docking station and/or a monitoring mode or cause the drone to continue to the apparent position of the apparent source. The drone may provide an audio and/or visual feed of the surrounding environment through the communication network to a remote monitor such that a user of the remote monitor may characterize the audio signals. An entry of the acoustic repository is then updated based on the characterization. Thus, the acoustic monitoring system provides for a low-weight, more power-efficient, and enhanced autonomous drone by allowing the drone to maintain a smaller form factor, which may be beneficial in certain situations. Furthermore, the acoustic monitoring system provides a drone that has a reduced response time to initiate an action or alert and that may be used in low-visibility situations.

The method 600 begins at block 602 where a monitored space is monitored for acoustic energy. In an embodiment, at block 602 the drone 105/200 and/or the drone docking station 110/300 may be in a monitoring mode, also referred herein as a standby mode, and monitor for acoustic energy in a monitored space 102 (e.g., a yard, a home, a business, a park, a stadium, a transmission line area, an access space, underground shafts, or other spaces). The monitored space 102 may be contiguous or non-contiguous. The monitored space 102 may be defined by geofencing techniques that may include specific geographic coordinates such as latitude, longitude, and/or altitude, and/or operate within a range defined by a wireless communication signal. The drone 105/200 may include an acoustic sensor 115a/220 that is configured to detect acoustic energy within the monitored space 102 and generate an audio signal based on captured acoustic energy. Likewise, the drone docking station 110/300 may include the acoustic sensor 115b/320 that is configured to detect acoustic energy within the monitored space 102 and generate an audio signal based on captured acoustic energy. In another example, the drone 105 and the drone docking station 110 may be coupled (e.g., wired and/or wirelessly) with acoustic sensors 115c-d that are dispersed throughout the monitored space 102.

While in the monitoring mode, the drone 105/200 may be docked with the drone docking station 110. However, in other examples, the drone 105/200 may be at a monitor location or a standby location, the drone 105/200 may be proceeding along a patrol path within the monitored space 102, or at another monitoring position such as hovering in the monitored space 102. While the drone 105/200 and/or the drone docking station 110/300 is monitoring the monitored space 102, the drone 105/200 and/or the drone docking station 110/300 may be waiting to receive any audio signals captured by any of the acoustic sensors 115a-d and generated by acoustic energy received from the monitored space 102. While the above example for block 602 of method 600 describes the drone 105/200 being in a monitoring mode when monitoring the monitored space, one skilled in the art in possession of the present disclosure will recognize that at block 602 the drone 105/200 may be in any other mode, such as in-flight or in an investigate mode as described further below, and still be monitoring the monitored space 102 for acoustic energy of one or more apparent sources.

Figure 7A:
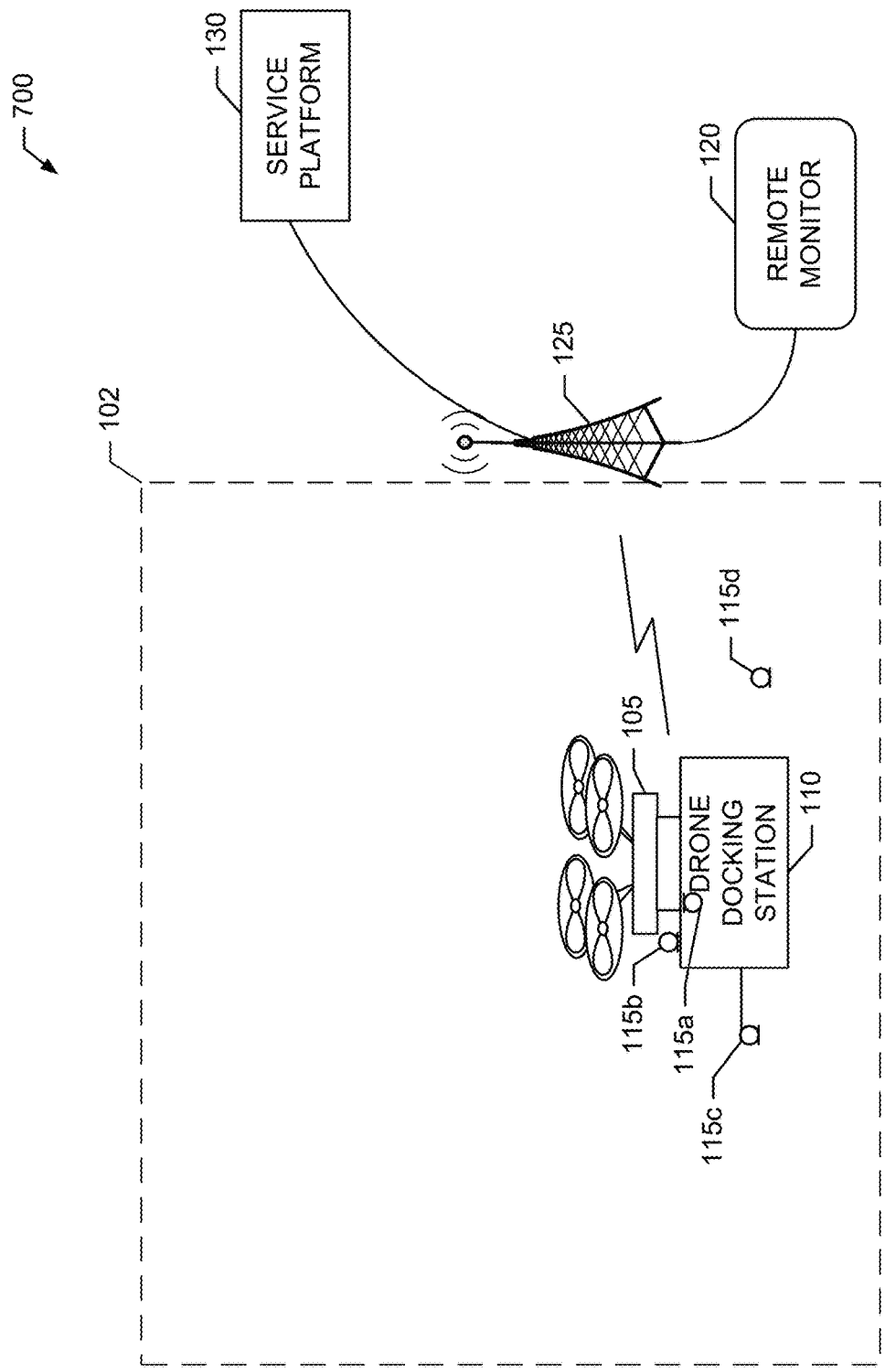
FIG. 7A is a schematic view illustrating an embodiment of the acoustic monitoring system during the method of FIG. 6A and FIG. 6B.

With reference to FIGS. 7A-7F, embodiments of an acoustic monitoring system are illustrated for reference to the discussion of the method 600. Referring to FIG. 7A, and with reference to FIG. 1 and block 602 of method 600, an acoustic monitoring system 700 is illustrated that includes the acoustic monitoring system 100 as illustrated in FIG. 1. As illustrated in FIG. 7A, the acoustic monitoring system 700 may be in a monitoring mode monitoring a monitored space 102 for acoustic energy as described at block 602. In the illustrated example, the drone 105 may be docked at the drone docking station 110 awaiting audio signals captured by the acoustic sensors 115a-d that are based on acoustic energy that the acoustic sensors 115a-d receive from the monitored space 102.

The method 600 then proceeds to block 604 where acoustic energy is received using an acoustic sensor. In an embodiment, at block 604 at least one of the acoustic sensors 115a-d may receive acoustic energy from the monitored space 102. The acoustic energy may be generated by an apparent source. For example, bird's vocal cords may generate a "tweet" sound or a car's horn when activated may generate a "honk" sound. In other examples, the acoustic energy may be reflected acoustic energy by an apparent source. For example, a communications wire transmission pole may reflect the sound of wind to provide acoustic energy and/or reflect acoustic energy generated from an acoustic emitter 224/324 such that reflected acoustic energy is received by the acoustic sensors 115a-d.

The method 600 then proceeds to block 606 where the received acoustic energy is captured as an audio signal. In an embodiment, at block 606 any of the acoustic sensors 115a-d may capture the acoustic energy as an audio signal. For example, the acoustic sensors may include a microphone or other transducer that converts the acoustic energy to an audio signal, which is a representation of the acoustic energy as an electrical voltage. The acoustic sensor 115a-d may provide the audio signal to the acoustic analysis engine 206/306 of the drone 105/200 and/or drone docking station 110/300.

The method 600 then proceeds to block 608 where the audio signal is computationally processed against a repository of acoustic profiles. In an embodiment, at block 608 the acoustic analysis engine 206/306 of the drone 105/200 and/or drone docking station 110/300 may computationally process the audio signals received by the acoustic sensors 115a-d. The acoustic analysis engine 206/306 may determine whether the audio signal has substantial correspondence with an acoustic profile stored in an acoustic repository such as a whitelist (e.g., whitelist 216, 316, and/or 412) and/or a blacklist (e.g., the blacklist 218, 318, and/or 414). An acoustic profile may be a digital summary of an audio signal such as an acoustic fingerprint that can be used to identify an audio sample of the audio signal. The acoustic profile may include feature vectors that define characteristics of an audio signal such as an average zero-crossing rate, average spectrum prominent tones across a set of frequency bands, estimated tempo, spectral flatness, bandwidth, and/or other audio signal features suitable for identifying audio signals. Each acoustic profile may be associated with an apparent source identifier that identifies an apparent source that provides the acoustic profile. The acoustic profile may also be configured such that any audio compression and/or encoding techniques (e.g., AAC, MP3, WMA, Vorbis, and other audio compression and/or encoding techniques) performed on the audio signal allow the acoustic analysis engine 206/306 to identify the audio signal based on the acoustic profiles. The audio signals have substantial correspondence with an acoustic profile when a predefined condition is satisfied. For example, the predefined condition may be that one or more feature vectors of the audio signal match or are within a threshold of similarity (e.g., 50% similar, 60% similar, 70% similar, 80% similar, 85% similar, 90% similar, 95% similar, 99% similar, 100% similar and other thresholds of similarity) between the audio signal and an acoustic profile. Substantial correspondence may also include situations where unsupervised machined learning techniques (e.g., using cluster analysis), and/or supervised machine learning techniques (e.g., using statistical classification) determines that audio signals in one group are more similar to each other than those in other groups.

Furthermore, the acoustic repository that the audio signal is computationally processed against may be selected from a plurality of acoustic repositories. For example, the acoustic repository may be selected based on environmental criteria such as the monitored space 102, a time of day, conditions of the monitored space 102, mission or operating parameters, and/or any other criteria. For example, the acoustic monitoring system 100 may determine that the drone 105/200 is located in the northwest region of the country, the time is after sunset, and it is raining outside. A particular acoustic repository that is associated with such environmental criteria may be selected as the acoustic repository from which to computationally process the audio signal against.

In another example, the acoustic repository of acoustic profiles may be stored locally on the storage system 214 of the drone 200 and/or the storage system 314 of the drone docking station 300 to provide a local acoustic repository, and/or stored remotely and managed at the service platform 130/400 to provide a remote acoustic repository. In various examples, a portion of the local acoustic repository may be stored in cache of the drone 200 and/or docking station 300. The portion of the local acoustic repository stored in cache may include acoustic profiles that are frequently used and/or have a priority over other acoustic profiles. For example, the drone 200 may store acoustic profiles associated with itself in the cache so as to ignore acoustic energy generated by its propellers, engines, and the like. In another example, the cache may store acoustic profiles for a mission critical objective. Storing acoustic profiles in cache will allow the drone 200 to navigate or respond to the captured audio signal faster because the acoustic monitoring system 100 may be configured to initially computationally process any audio signals captured locally with the acoustic analysis engine 206 and/or 306 to determine whether the audio signal has substantial correspondence with an acoustic profile stored on the local acoustic repositories (e.g., the whitelists 216 and 316 and/or the blacklists 218 and 318). If the audio signal lacks substantial correspondence with the local acoustic repository (e.g., the whitelists 216 and 316), the drone 105/200 or the drone docking station 110/300 may provide the audio signal, feature vectors of the audio signal, and/or a compressed and/or encoded version of the audio signal to the service platform 130/400 through the communication network 125. The acoustic analysis engine 406 of the service platform 400 may computationally process the audio signal (e.g., feature vectors of the audio signal, the compressed and/or encoded audio signal, and/or other variations of the audio signal) by determining whether the audio signal substantially corresponds with an acoustic profile stored remotely at the acoustic repository (e.g., the whitelist 412 and/or the blacklist 414) in the storage system 410. In a specific example, the local acoustic repository at the storage systems 214 and 314 may store a first portion of the acoustic profiles of the acoustic repository and the remote acoustic repository at the storage system 410 may store a second portion of the acoustic profiles. In other examples, the local acoustic repository and the remote acoustic repository may store a third portion of the acoustic profiles, which are the same acoustic profiles on each repository. For example, the whitelist 216 may store a first acoustic profile and a second acoustic profile, and the whitelist 412 may store the second acoustic profile and a third acoustic profile.

The method 600 then proceeds to block 610 where it is determined whether the drone is in a monitoring mode. In an embodiment, at block 610 the drone controller 204 and/or the drone docking engine 304 may determine whether the drone 105/200 is in a monitoring mode such that the drone is at a monitoring location (e.g., hovering, docked at the drone docking station 110, at a standby position, and on a patrol route), or whether the drone 105/200 is in-flight or in another mode. The drone 105/200 may be in-flight when the drone is autonomously navigating toward an apparent position of an apparent source as discussed in further detail below. The drone 105/200 may be considered not to be in-flight when the drone 105/200 is hovering at a monitoring location or on a patrol path but otherwise flying in the air in the case of a UAV.

If the drone is in a monitoring mode, the method 600 then proceeds to block 611 where it is determined whether the audio signal has substantial correspondence with an acoustic profile of an include-type entry in the acoustic repository. For example, the acoustic monitoring system 100 may determine whether the captured audio signal has substantial correspondence with an acoustic profile of the blacklist (e.g., the blacklist 218, 318, and/or 414). The determination at block 612 is based on the computational processing that was performed by the acoustic analysis engines 206, 306, and/or 406 at block 608 where a determination was made as to whether substantial correspondence exists between the audio signal and any of the acoustic profiles of the acoustic repository. If the audio signal has substantial correspondence with an acoustic profile of the blacklist the method 600 proceeds to block 616 discussed below.

If the audio signal has substantial correspondence with an acoustic profile of an include-type entry in the acoustic repository at block 611, the method 600 then proceeds to block 612 where it is determined whether the audio signal has substantial correspondence with an acoustic profile of exclude-type entry in the acoustic repository. In an embodiment, at block 612 the acoustic monitoring system 100 may determine whether the captured audio signal has substantial correspondence with an acoustic profile of the whitelist (e.g., the whitelist 216, 316, and/or 412). The determination at block 612 is based on the computational processing that was performed by the acoustic analysis engines 206, 306, and/or 406 at block 608 where a determination was made as to whether substantial correspondence exists between the audio signal and any of the acoustic profiles of the acoustic repository. If the audio signal has substantial correspondence with an acoustic profile of the whitelist, the method 600 proceeds to block 614 where the audio signal is ignored. The method 600 then returns to block 602 where the monitored space continues to be monitored for acoustic energy. While the specific example describes the acoustic monitoring system 100 as ignoring audio signals that has substantial correspondence with the whitelist while the drone 105/200 is in a monitoring/standby mode, one skilled in the art in possession of the present disclosure will recognize that other actions may be taken by the acoustic monitoring system 100 when an audio signal has substantial correspondence with a whitelist and still fall within the scope of the present disclosure. For example, the drone 105/200 may move away from apparent source, move toward the apparent source, perform some action with the payload of the drone, and other drone actions. In other examples, the acoustic profile that substantially corresponds with the audio signal may be updated based on the audio signal to obtain a more comprehensive acoustic profile for the particular apparent source using any machine learning algorithms described further below.

Figure 7B:
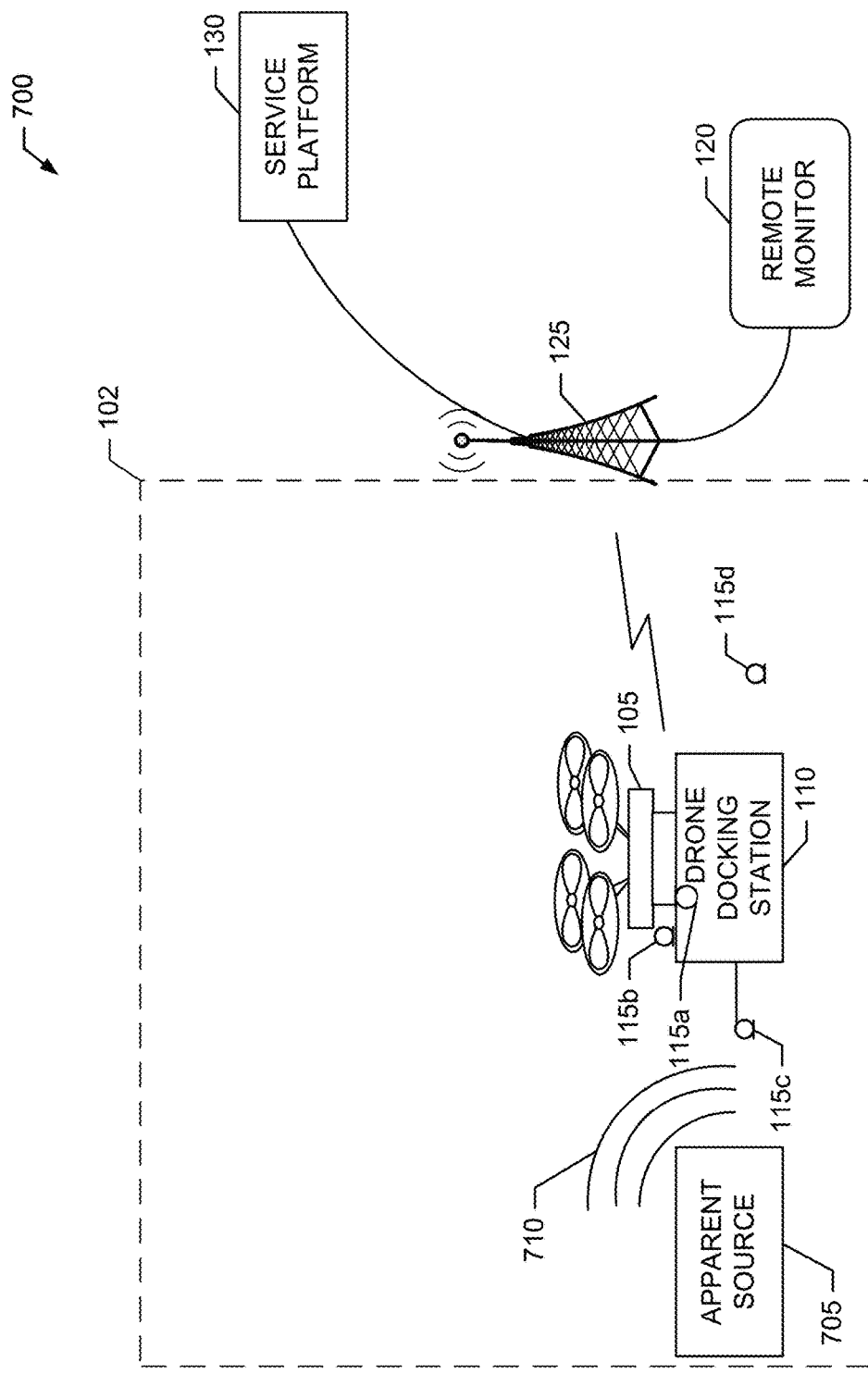
FIG. 7B is a schematic view illustrating an embodiment of the acoustic monitoring system of FIG. 7A where acoustic energy is provided by an apparent source of the acoustic energy during the method of FIG. 6A and FIG. 6B.

Continuing with the specific example of the acoustic monitoring system of FIGS. 7A-7F, FIG. 7B illustrates the acoustic monitoring system 700 with respect to blocks 604, 606, 608, 610, and 614 of method 600. As illustrated in FIG. 7B, an apparent source 705 may be providing acoustic energy 710 in the monitored space 102. Any of the acoustic sensors 115a-d may receive the acoustic energy 710 and capture the received acoustic energy 710 as an audio signal according to blocks 604 and 606 of method 600. The drone 105 and/or the drone docking station 110 may computationally process the audio signal against an acoustic repository of acoustic profiles according to block 608. For example, the acoustic repository may be a whitelist that includes acoustic profiles of apparent sources of the acoustic energy that the acoustic monitoring system 700 ignores as "noise" when the acoustic monitoring system 700 is monitoring a monitored space. For example, acoustic energy provided by components (e.g., motors, propellers, fans, etc.) of the drone 105, wind, rustling leaves, certain animal sounds, and other acoustic energy that is generally not of importance to a user of the acoustic monitoring system 700 may be included on the whitelist. As such, the acoustic energy 710 of FIG. 7B may be determined to be produced by a neighbor's wind chimes that are on a local whitelist of the drone 105 and/or drone docking station 110, which may be acoustic energy that is frequently received by the acoustic monitoring system 700 but is not of importance to the user.

In another example, the acoustic energy 710 may be generated by a flock of cranes flying overhead, which the drone 105 and/or drone docking station 110 may not have on their local whitelist and/or have never received an audio signal originating from a flock of cranes. The drone 105 and/or drone docking station 110 may provide an encoded audio signal and/or feature vectors of the audio signal to the service platform 130, which may process the received encoded audio signal and/or feature vectors against acoustic profiles in a remote acoustic repository such as the whitelist of the service platform 130. The service platform 130 may determine that the audio signal provided by the flock of cranes has substantial correspondence with an acoustic profile on the service platform's whitelist and provides a notification back to the drone 105 and/or drone docking station 110 that the audio signal has substantial correspondence with an acoustic profile of the whitelist. The whitelist of the service platform 130 may include acoustic profiles of previous audio signals that were provided by the drone 105 and/or drone docking station 110 that are not considered frequently received audio signals, and/or the acoustic profiles may be aggregated acoustic signals provided by other acoustic monitoring systems that have captured audio signals and provided those audio signals along with user characterizations as whitelist audio signals.

While computationally processing the captured audio signal, the acoustic monitoring system 700 may determine whether the drone 105 is in the monitoring mode (e.g., a standby mode) of operation according to block 610 of method 600. As illustrated in FIG. 7B, the drone 105 is docked at the drone docking station 110 and is in a monitoring mode, and thus the acoustic monitoring system 700 determines whether the computational processing of the captured audio signal has been determined to be on a whitelist according to block 612. The drone 105 and/or drone docking station 110 may determine that the captured audio signal associated with the acoustic energy 710 is on a whitelist and ignore the captured audio signal according to block 614 and return to monitoring the monitored space 102 according to block 602 and as illustrated in FIG. 7A.

Returning to block 612, if the audio signal lacks substantial correspondence with any acoustic profile of the whitelist, then the method 600 proceeds to block 616 where the drone is dispatched and autonomously navigated toward an apparent position within the monitored space of the apparent source of the received acoustic energy. In an embodiment, at block 616 the acoustic analysis engine 206, 306, and/or 406 may have determined that the captured audio signal lacks substantial correspondence with an acoustic profile of the whitelist 216, 316, and 412 and provided instructions to the mobility controller 207 of the drone 105/200 that the captured audio signal lack substantial correspondence with an acoustic profile of the whitelist, which initiates an in-flight mode of the a drone 105/200. The in-flight mode causes the drone 105/200 to dispatch and autonomously navigate toward the apparent position of the apparent source of the acoustic energy. In another example, for situations where the audio signal that lacks substantial correspondence with any acoustic profile of the whitelist, the audio signal may have substantial correspondence with an acoustic profile of a blacklist (e.g., the blacklist 218, 318, and/or 414). If the captured audio signal has substantial correspondence with an acoustic profile of the blacklist, then instructions may be provided to the drone 105/200 to enter the in-flight mode where the drone 105/200 is dispatched and autonomously navigated toward an apparent position of the apparent source of the acoustic energy within the monitored space 102. However, in other examples, the audio signal may lack substantial correspondence with acoustic profiles from both a whitelist and a blacklist, which initiates the in-flight mode of the drone 105/200.

In an embodiment, the acoustic analysis engine 206, 306, and/or 406 may determine an apparent position of the apparent source of the acoustic energy such as a relative direction from which the acoustic energy is being provided by the apparent source and/or the approximate location of the apparent source. For example, the acoustic monitoring system 100 may include the acoustic sensors 115a-d that are positioned about monitored space 102 to receive acoustic energy and capture audio signals within the monitored space. The acoustic analysis engines 206 and/or 306 may create a time stamp that includes the time at which each acoustic sensor 115a-d captured the audio signal. The acoustic analysis engines 206 and/or 306 may then use known positions of the acoustic sensors 115a-d along with the time stamps that indicate when each acoustic sensor 115a-d captured the audio signal to determine the source location of the audio signal based on time-difference-of-arrival (TDOA) and triangulation techniques. In another example, the acoustic sensors 115a-d may be directionally-discriminating acoustic sensors that are configured to determine the general direction from which acoustic energy is being provided. The acoustic analysis engine 206 and/or 306 may then provide the apparent position to the mobility controller 207 of the drone 105/200 such that the drone 105/200 may autonomously navigate toward the apparent position of the apparent source of the acoustic energy. The method 600 then returns to block 602 where the drone 105/200 and/or the drone docking station 110/300 is monitoring the monitored space 102 while the drone 105/200 is in-flight toward the apparent source of the acoustic energy.

Continuing with the specific example of the acoustic monitoring system of FIGS. 7A-7F, FIGS. 7B-7C illustrate the acoustic monitoring system 700 with respect to blocks 616 of method 600. As illustrated in FIG. 7B, an apparent source 705 may be providing acoustic energy 710 in the monitored space 102 and the drone 105 is in a monitoring mode. The acoustic monitoring system 700 determines that the audio signal associated with the acoustic energy 710 lacks substantial correspondence with an acoustic profile on the whitelist. The apparent source 705 may provide an audio signal that does not have an acoustic profile in the acoustic repository and/or lacks substantial correspondence with an acoustic profile, substantially corresponds with an acoustic profile of a blacklist, substantially corresponds with an acoustic profile that is not associated with a whitelist, and the like. For example, the acoustic energy 710 may have been the result of a glass window shattering and the whitelist does not have an acoustic profile for glass shattering. Thus, there is lack of substantial correspondence between the audio signal and an acoustic profile of the whitelist.

Figure 7C:
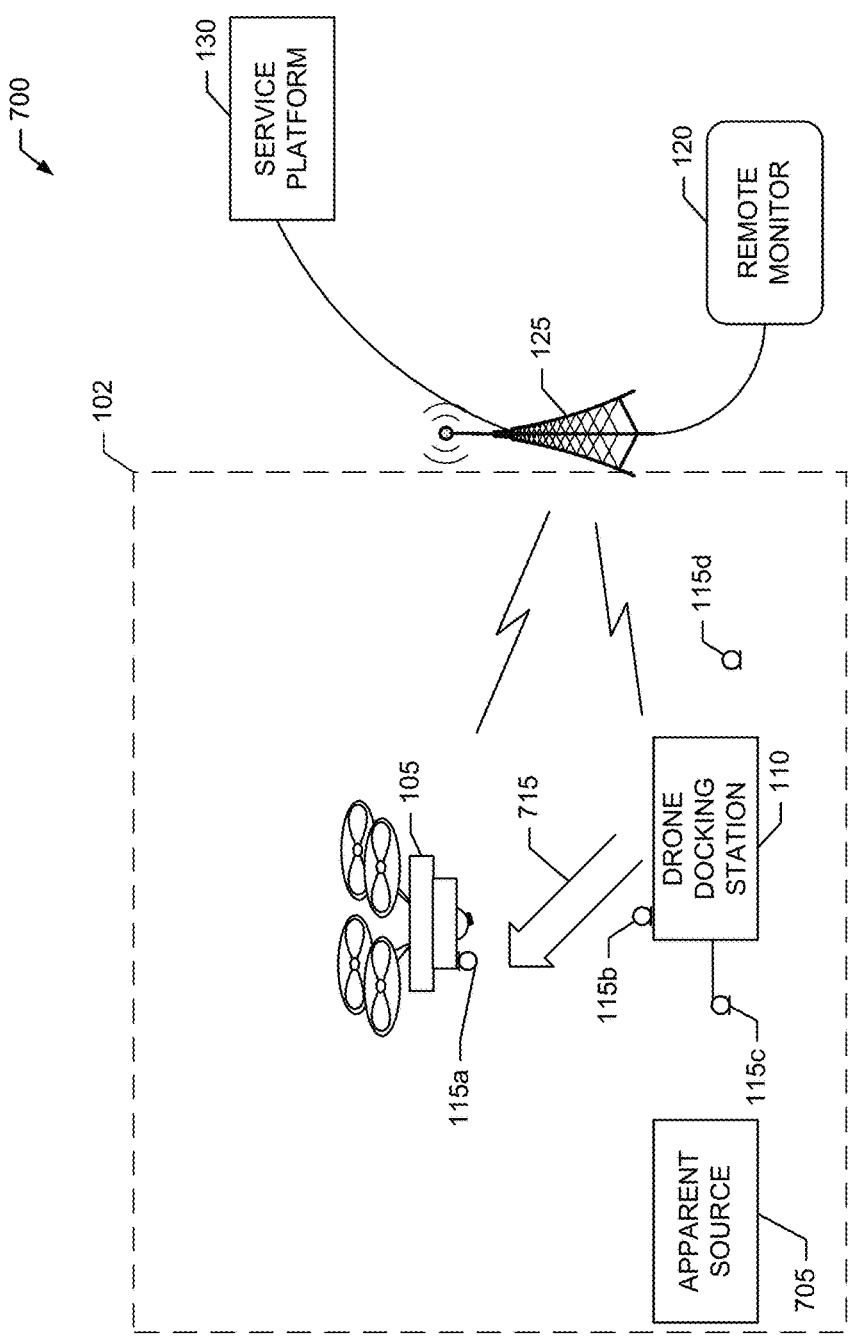
FIG. 7C is a schematic view illustrating an embodiment of the acoustic monitoring system of FIG. 7B where a drone is in-flight toward the apparent source of the acoustic energy due to the acoustic energy lacking substantial correspondence with an acoustic profile on a whitelist during the method of FIG. 6A and FIG. 6B.

As illustrated in FIG. 7C, the audio signal lacking substantial correspondence with each of the acoustic profiles of the whitelist or substantially corresponding with any acoustic profile of the blacklist may cause the drone 105 and/or the drone docking station 110 to determine the apparent position of the apparent source 705. For example, the acoustic sensor 115c may have captured the audio signal at a first time, the acoustic sensor 115b may have captured the audio signal at a second time subsequent to the first time, the acoustic sensor 115a may have captured the audio signal at a third time subsequent to the second time, and the acoustic sensor 115d may have captured the audio signal at a fourth time subsequent to the third time. The drone 105 and/or drone docking station 110 may have generated a time stamp for each of the first time, the second time, the third time, and the fourth time and used these time stamps as well as the known positions of the acoustic sensors to determine the apparent position (e.g., direction, location) of the apparent source 705. The drone 105 and/or drone docking station 110 may use the determined apparent position to autonomously navigate toward the apparent source 705 as illustrated by the arrow 715.

Returning to block 610 of method 600, if the drone is not in a monitoring mode such that the drone is in-flight autonomously navigating toward the apparent position of the apparent source that provided the received acoustic energy, then the method 600 proceeds to block 617 of FIG. 6B where it is determined whether the audio signal has substantial correspondence with any of the acoustic profiles of the include-type entries characteristic of sounds to be investigated. In an embodiment, at block 617 the drone 105 may have been dispatched and is autonomously navigating toward the apparent source when the acoustic sensors 115a-d received the acoustic energy at block 604 of FIG. 6A from the apparent source. Similar to block 611, at block 617 the acoustic analysis engine 206, 306, and/or 406 may determine whether the audio signal has substantial correspondence with an acoustic profile of the blacklist. If at block 617 the audio signal has substantial correspondence with any acoustic profile of the blacklist, then the method 600 proceeds to block 624 discussed below.

If at block 617 the audio signal lacks substantial correspondence with any acoustic profile of the blacklist then the method 600 proceeds to block 618 of FIG. 6B where it is determined whether the audio signal has substantial correspondence with any of the acoustic profiles of the exclude-type entries characteristic of sounds to be ignored. In an embodiment, at block 618 the drone 105 may have been dispatched and is autonomously navigating toward the apparent source when the acoustic sensors 115a-d received the acoustic energy at block 604 of FIG. 6A from the apparent source. Similar to block 612, at block 618 the acoustic analysis engine 206, 306, and/or 406 may determine whether the audio signal has substantial correspondence with an acoustic profile of the whitelist. If at block 618 the audio signal lacks substantial correspondence with an acoustic profile of the whitelist, then the method 600 proceeds to block 624 discussed below.

If the audio signal has substantial correspondence with an acoustic profile of the whitelist, then the method 600 may proceed to block 622 where a return of the drone to a monitoring or standby location is initiated. In an embodiment, at block 622 the drone 105/200 and/or the drone docking station 110/300 may provide instructions to the mobility controller 207 to return the drone 105/200 to a monitoring or standby location. For example, because the acoustic energy provided by the apparent source that caused the drone 105/200 to be in-flight toward the apparent position of the apparent source is now determined to be on the whitelist, the drone 105/200 no longer needs to continue toward the apparent source. Therefore, the drone 105/200 may initiate the monitoring mode, which may include returning the drone 105/200 to the drone docking station 110/300, causing the drone 105/200 to hover at the location at which the drone 105/200 received the instructions to operate in the monitoring mode, returning the drone 105/200 to another monitoring or standby position, and/or causing the drone 105/200 to follow a patrol path. The method 600 then proceeds to block 602 where the monitored space continues to be monitored for acoustic energy.

While blocks 617, 618, and 622 assume that the drone 105 is capturing the second audio signal from the apparent source that caused drone to be in-flight, the drone 105/200 may be capturing the second audio signal from a second apparent source. In such cases if the second audio signal is on a whitelist, the drone 105/200 may ignore the second audio signal and continue in-flight toward the apparent source of the first audio signal. If the second audio signal is on a blacklist or is not on either of the whitelist or blacklist the drone 105/200 may queue the second audio signal to investigate the second apparent source after the investigating the apparent source that caused the drone to be in-flight. In another example, the drone 105/200 may switch to navigating toward the second apparent source if that second apparent source has a higher priority based on type of source, distance, shortest route to investigate both apparent sources, etc. In various embodiments, the drone 105/200 may distinguish between the first apparent source and the second apparent source based on location and/or by computationally processing the second audio signal to determine whether it substantially corresponds with the first audio signal.

Figure 7D:
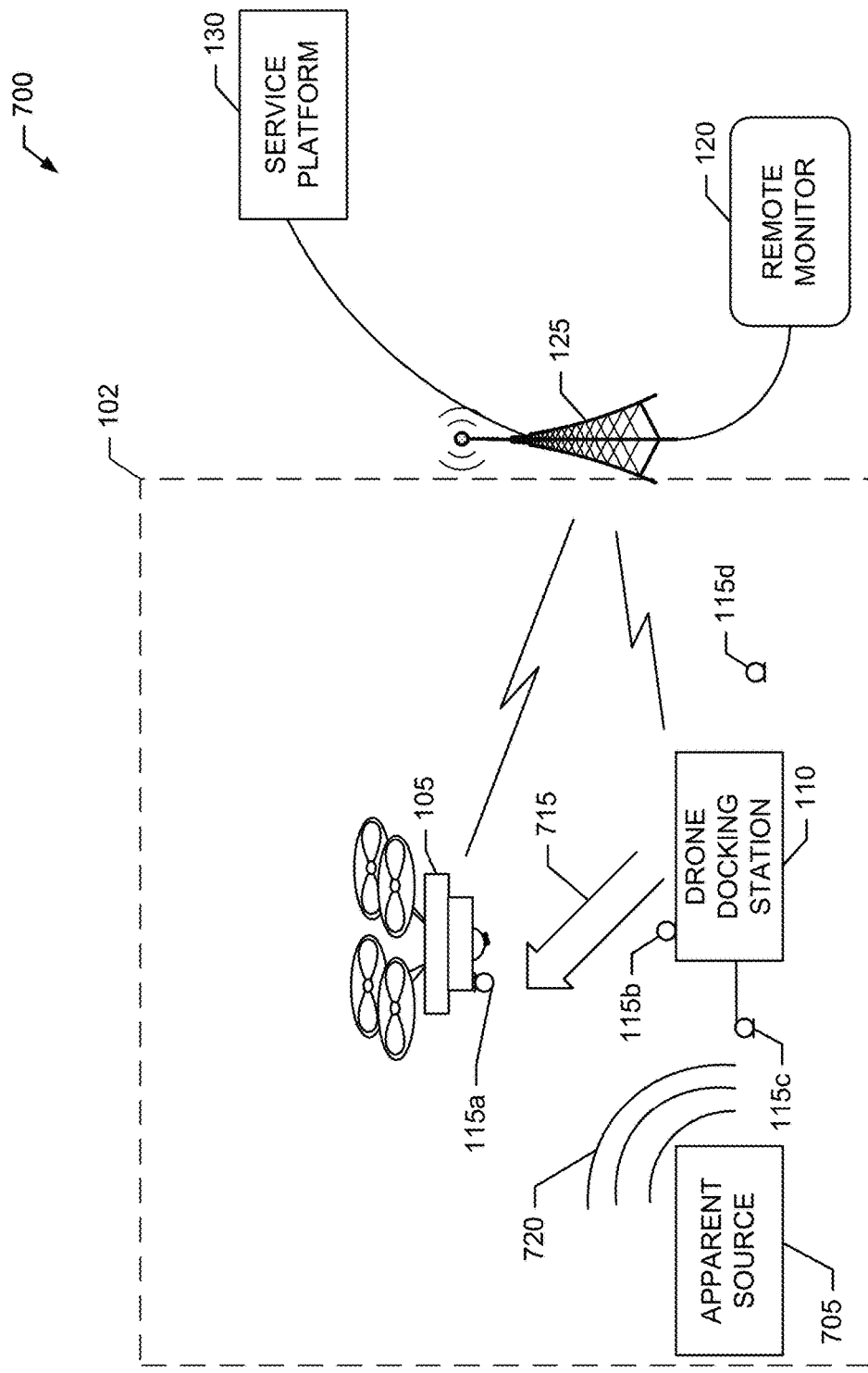
FIG. 7D is a schematic view illustrating an embodiment of the acoustic monitoring system of FIG. 7C where acoustic energy is provided by the apparent source of the acoustic energy when the drone is in-flight during the method of FIG. 6A and FIG. 6B.
Figure 7E:
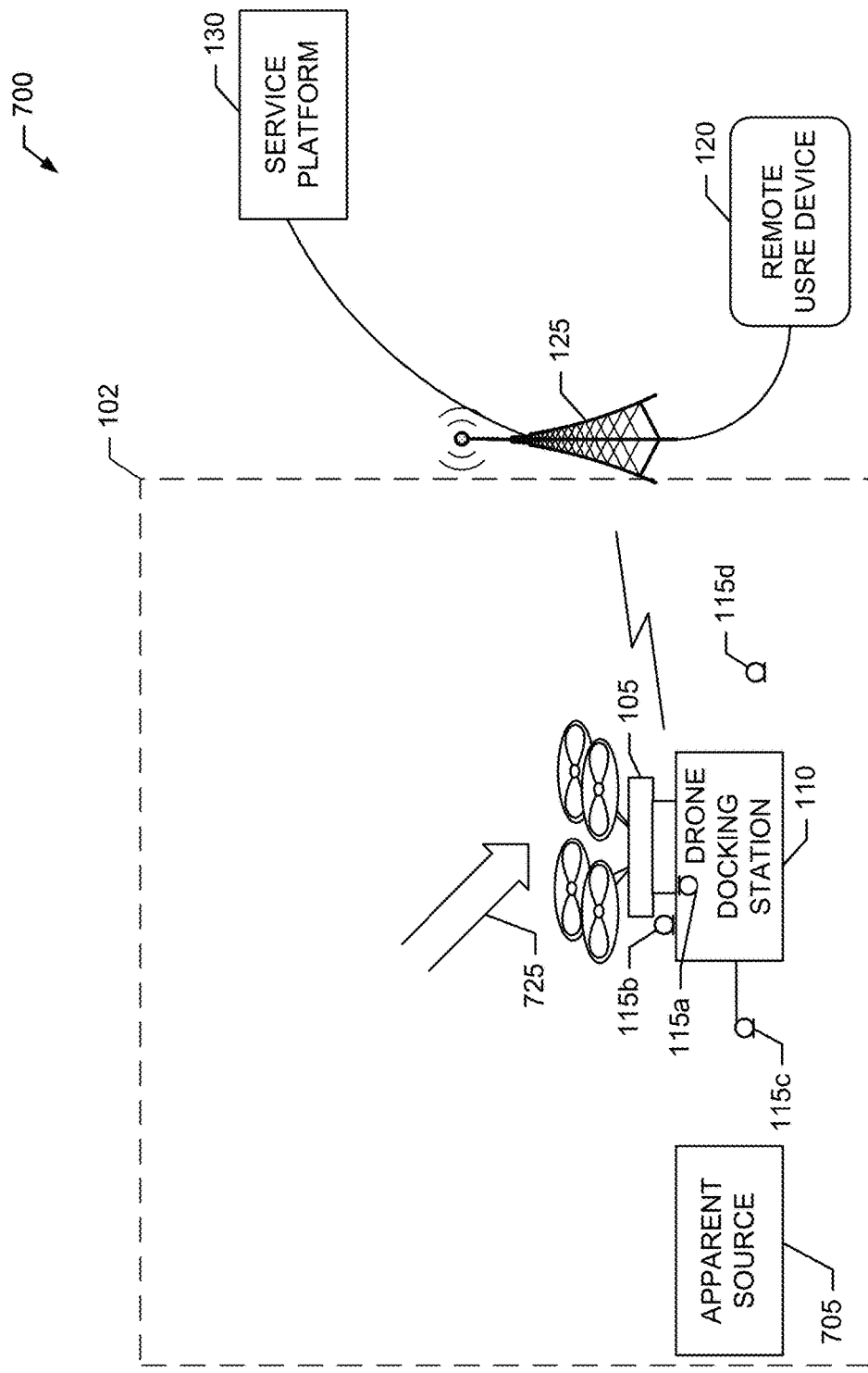
FIG. 7E is a schematic view illustrating an embodiment of the acoustic monitoring system of FIG. 7D where the drone returns to a drone docking station due to the acoustic energy received in-flight having substantial correspondence with an acoustic profile in a whitelist during the method of FIG. 6A and FIG. 6B.

Continuing with the specific example of the acoustic monitoring system of FIGS. 7A-7F, FIGS. 7D-7E illustrate the acoustic monitoring system 700 with respect to blocks 616, 618, 620, and 622 of method 600. As illustrated in FIG. 7D, an apparent source 705 may be providing acoustic energy 720 in the monitored space 102 and the acoustic monitoring system 700 determined that the drone 105 is in in-flight toward the apparent position of the apparent source 705 as discussed at block 616 of method 600. The drone 105 and/or the drone docking station 110 may receive an audio signal captured from the acoustic energy 720 by one or more of the acoustic sensors 115a-d and computationally process the audio signal. As illustrated in FIG. 7E, the acoustic monitoring system 700 may determine that the audio signal associated with the acoustic energy 720 has substantial correspondence with an acoustic profile on the whitelist with respect to block 618. Furthermore, the acoustic monitoring system 700 may determine that the audio signal captured from the acoustic energy 720 has substantial correspondence with the acoustic profile of the audio signal associated with acoustic energy 710 that caused the drone 105 to be in-flight. Because the audio signal associated with the acoustic energy 720 has substantial correspondence with both an acoustic profile of the whitelist and the audio signal associated with acoustic energy 710, the drone 105 will return to the drone docking station 110 as indicated by arrow 725 and initiate the monitoring mode with respect to block 622 and 602 of the method 600.

Returning to block 620 of method 600, if at block 618 the audio signal lacks substantial correspondence with the acoustic profile of the whitelist, then the method 600 proceeds to block 624 where an investigate mode is initiated. In an embodiment, at block 624 the drone 105/200 may continue in-flight toward the apparent position of the apparent source of the acoustic energy if audio signals of acoustic energy received by the acoustic sensors 115*a-d* while in-flight lack substantial correspondence with an acoustic profile of the whitelist or have substantial correspondence with an acoustic profile of the blacklist. In another example, the drone 105/200 and/or the drone docking station 110 may not receive any acoustic energy while the drone 105/200 is in-flight and the drone 105/200 may initiate an investigate mode when the drone 105/200 reaches the apparent position of the apparent source. While specific examples describing when the drone 105/200 enters investigate mode are discussed above, one skilled in the art in possession of the present disclosure will recognized that the drone 105/200 may enter investigate mode at any time subsequent to the drone 105/200 determining that, while in a monitoring mode, the captured audio signal lacks substantial correspondence with an acoustic profile of the whitelist.

In an optional embodiment, while the drone 105/200 is in the investigate mode and if the audio signal lacks substantial correspondence with any acoustic profile of the acoustic repository such that the apparent source is unknown, the drone 105/200 may try to determine the identity of the apparent source using additional sensor data. For example, the drone 105/200 may include the imaging sensor 222. The drone 105/200 may use the imaging sensor 222 to capture images, video, and/or other visual data of the apparent position of the apparent source. During the investigate mode, the acoustic monitoring system 100 may use computer vision methods (e.g., object recognition) to computationally process an image against the whitelist. For example, the drone controller 204, the drone docking engine 304, and/or the services engine 404 may include an image analysis engine (e.g., the image analysis engine 407) that may computationally process feature vectors from a captured image and determine whether the features vectors from the captured image have substantial correspondence with any visual profiles that are associated with apparent source identifiers in the acoustic repository. Based on substantial correspondence with any visual profile of the whitelist, the acoustic monitoring system 100 may initiate a return of the drone 105/200 to the monitoring mode and update an acoustic profile of the whitelist and associated with the apparent source identifier to include acoustic profiles of audio signals captured from the monitored space that lacked substantial correspondence with the acoustic profile.

The method 600 then proceeds to block 626 where in response to an investigate mode being initiated, a remote monitor is notified of the unidentified audio signal. In an embodiment, at block 626 the drone 105/200 and/or the drone docking station 110/300 may provide a notification to the remote monitor 120/500 through the communication network 125 such that the notification is received by the communications system 506 and processed by the application engine 504 of the remote monitor 120/500. The application engine 504 may provide, through a graphical user interface of a drone application on a display screen of a display device coupled to the application engine 504, the processed notification that the drone 105/200 and or drone docking station 110/300 has detected an unidentified audio signal.

The method 600 then proceeds to block 628 where at least one of an audio feed and a visual feed are provided to the remote monitor. In an embodiment, at block 628 the drone 105/200 may provide at least one of an audio feed using the acoustic sensor 115*a*/220 and a visual feed using the imaging sensor 222 through the communication network 125 to the remote monitor 120/500 to be displayed through the drone application on the display screen of the display device of the remote monitor 120/500. In an example, a user of the remote monitor 120 may issue one or more commands based on the notification received. For example, the user may indicate a command selection by selecting a button on the graphical user interface associated with the notification received to provide at least one of an audio feed and visual feed (e.g., video feed and/or pictures of the monitored space 102) while the drone 105/200 is at the apparent position of the apparent source. In another example, the user may select a button to ignore the notification.

In an embodiment, the drone application may prompt the user for instructions as to how to proceed after providing the at least one of the audio feed and the visual feed. If the user selects the button to provide at least one of an audio feed and a visual feed, the drone application may prompt the user via the graphical user interface for a characterization of the apparent source based on the at least one of the audio feed and the visual feed. Through the graphical user interface of the drone application, the user may characterize the audio signal. The characterization may include an identification of the apparent source (e.g., a cat), an identification of the captured audio signal that the apparent source produced (e.g., a cat's meow, a cat's purr, or a cat's hiss), whether the apparent source and/or acoustic energy should be characterized as a belonging in the whitelist, blacklist, or other repositories in the acoustic repository, and/or other characterizations of audio signals. In another example, the drone 105/200 may provide at least one of an audio feed using the acoustic sensor 115*a*/220 and a visual feed using the imaging sensor 222 through the communication network 125 to the remote monitor 120/500 to be provided through an application programming interface to any native application of the remote monitor 120/500 that may use the audio feed and/or video feed to identify the apparent source without a remote user's input. For example, the remote monitor 120/500 may include an automated system programmed to characterize the apparent source using statistical classifier, machine learning and/or signal processing techniques The method 600 then proceeds to block 630 where an acoustic profile is updated and/or added to the repository based on a characterization of the audio signal by the remote monitor. In an embodiment, at block 630 the characterization of the audio signal by a user and/or a monitor application may be received by the drone 105/200, the drone docking station 110/300, and/or the service platform 130/400. The characterization may be used to update the whitelist including whitelist 216, 316, and/or 412. The characterization may be used to create a new entry including a new acoustic profile in the whitelist where the identifier of the apparent source indicated in the characterization is not present in the whitelist. Similarly, the characterization may be used to update the blacklist including the blacklist 218, 318, and/or 414. The characterization may be used to create a new entry including a new acoustic profile in the blacklist where the identifier of the apparent source indicated in the characterization is not present in the blacklist. An acoustic profile may be generated by the acoustic analysis engine 206, 306, and/or 406 based on the audio signals provided by the apparent source and may include any features as discussed above with respect to the audio profiles of the whitelist and/or blacklist.

In another example, if the identifier of the apparent source in the notification provided by the user of the remote monitor 120/500 corresponds with an identifier associated with an acoustic profile in the whitelist and/or the blacklist, the acoustic analysis engine 206, 306, and/or 406 may update the acoustic profile using the audio signal so that the whitelist and/or blacklist has a more comprehensive acoustic profile for that apparent source. Likewise, if the acoustic analysis engine 206, 306, and/or 406 determined that the audio signal is associated with an identifier associated with an acoustic profile of the whitelist and/or blacklist and the notification indicates that the acoustic analysis engine 206, 306, and/or 406 is incorrect, then the acoustic analysis engine 206, 306, and/or 406 may update that acoustic profile such that the acoustic analysis engine 206, 306, and/or 406 will not make the same incorrect determination. The acoustic analysis engine 206, 306, and/or 406 may be configured with one or more machine learning algorithms to perform supervised machine learning, unsupervised machine learning (e.g., deep belief networks, neural networks, statistical pattern recognition, rule-based artificial intelligence, etc.) semi-supervised learning, reinforcement learning, deep learning, and other machine learning algorithms when updating whitelist, blacklist and/or any other acoustic repository entries as well as their associated acoustic profiles. Following block 630, the method 600 may then end or return to block 602 where the monitored space is monitored for acoustic energy. For example, the drone 105/200 may return to the drone docking station 110 and enter the monitoring mode or return to a monitor or standby location within the monitored space 102 while the acoustic monitoring system monitors the monitored space for acoustic energy. In other examples, the remote user may have instructed the drone 105/200 to follow and/or otherwise observe the apparent source or to take other actions.

Figure 7F:
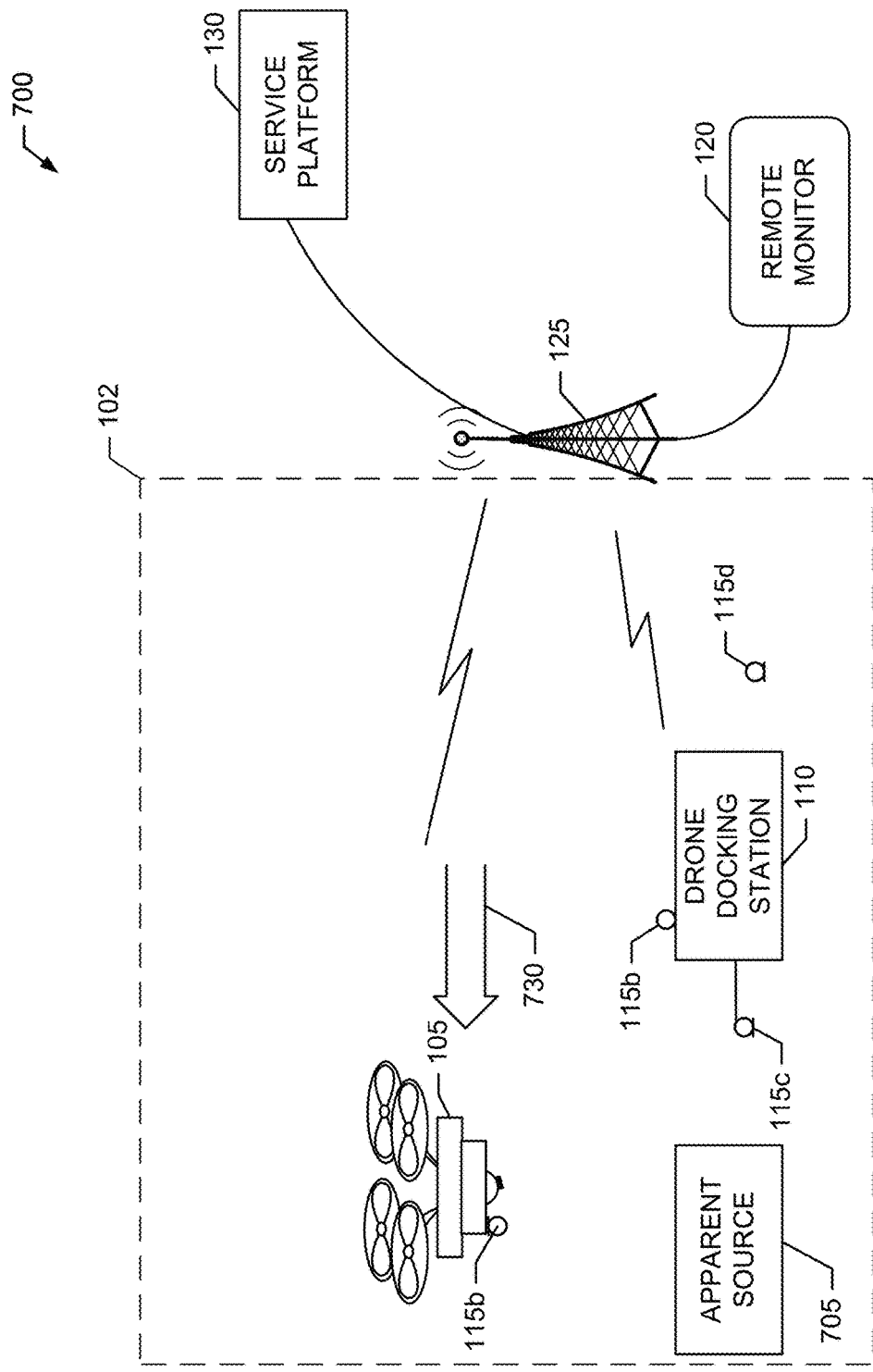
FIG. 7F is a schematic view illustrating an embodiment of the acoustic monitoring system of FIG. 7D where the drone continues toward the acoustic energy source due to the acoustic energy received in-flight lacking substantial correspondence with an acoustic profile in the whitelist or the acoustic energy lacking substantial correspondence to the original acoustic energy during the method of FIG. 6A and FIG. 6B.
Figure 8A:
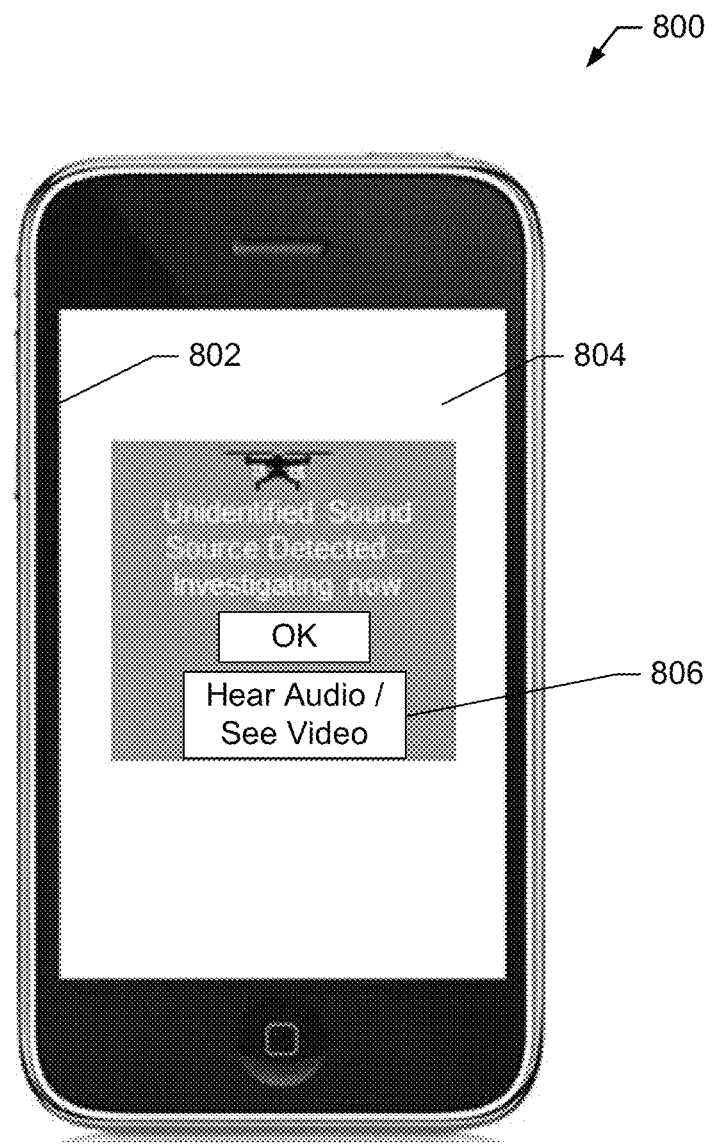
FIG. 8A is a screenshot of an embodiment of a remote monitor displaying a notification on a drone application.
Figure 8B:
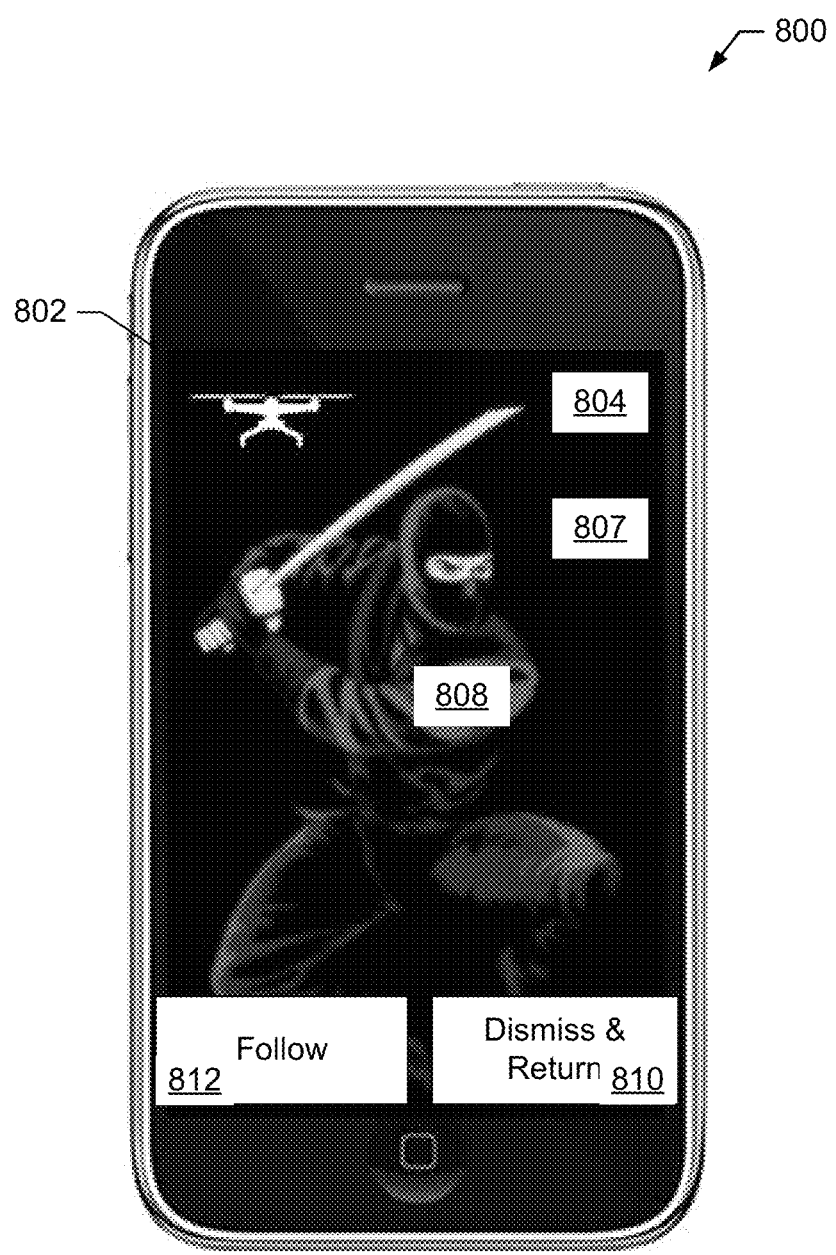
FIG. 8B is a screenshot of an embodiment of the remote monitor of FIG. 8A displaying an audiovisual feed of an apparent source of the acoustic energy in the monitored space on the drone application.
Figure 8C:
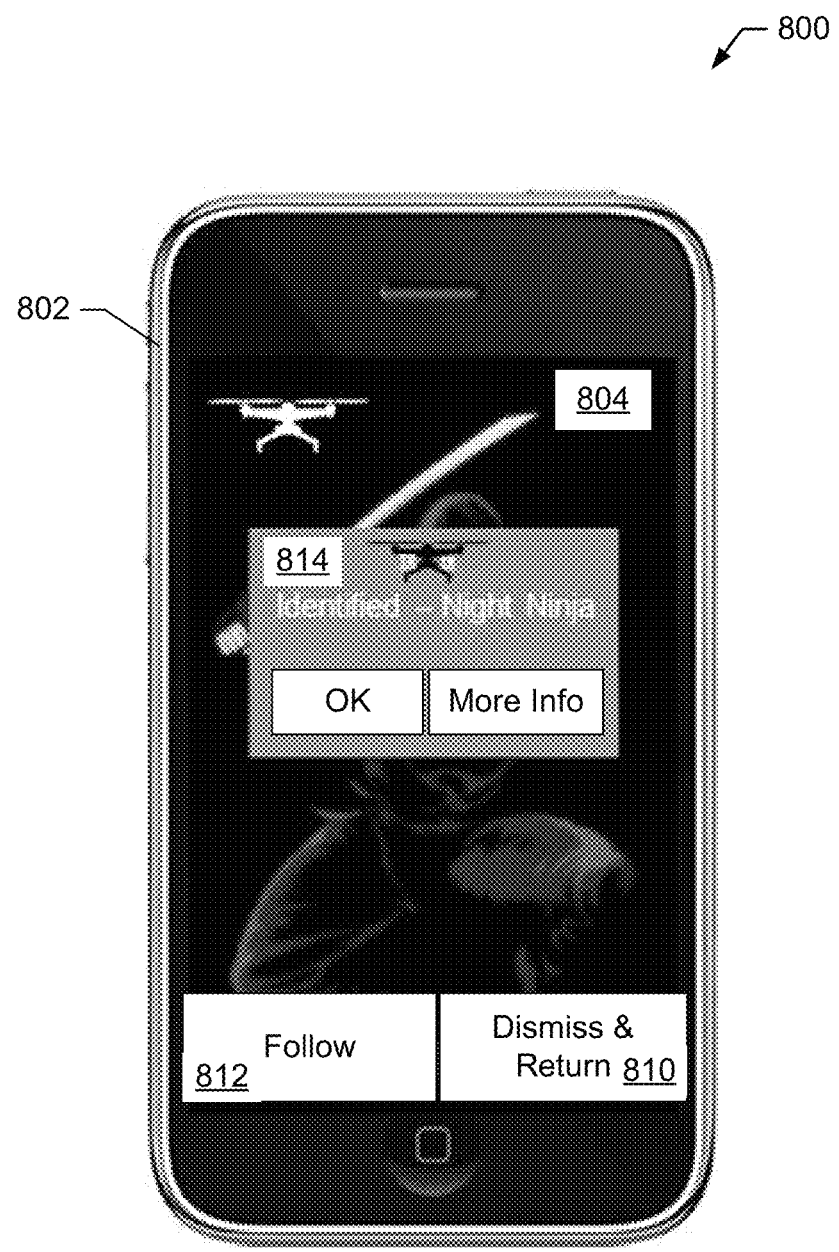
FIG. 8C is a screenshot of an embodiment of the remote monitor of FIG. 8B where the apparent source of the acoustic energy is characterized using the drone application.

Continuing with the specific example of the acoustic monitoring system of FIGS. 7A-7F, FIG. 7F illustrates the acoustic monitoring system 700 with respect to blocks 624, 626, and 628 of method 600. As illustrated in FIG. 7F, the drone 105 proceeds to the apparent position of the apparent source 705 as indicated by arrow 730 and enters an investigate mode. A notification is provided to the remote monitor 120 that an unidentified audio signal was detected within the monitored space 102. Referring to FIGS. 8A, 8B, and 8C, screenshots of specific example of the method 600 for acoustic monitoring are illustrated. Referring to FIG. 8A, a remote monitor 800 that includes a display screen 802 is illustrated. The remote monitor 800 may be any of the remote monitors 120/500 described above, and includes a drone application 804. The notification of an unidentified audio signal provided through the communication network 125 may be processed by the remote monitor 800 such that the notification is displayed on the display screen 802 using the drone application 804. The notification may provide the user of the remote monitor 800 as indicated by graphical user interface button 806 an option to receive at least one of an audio feed and a video feed of the monitored space 102 provided by the drone 105 of the acoustic monitoring system 700 while the drone 105 is at the apparent position of the apparent source. The user of the remote monitor 800 may select the option by pressing the graphical user interface button 806 to receive an audiovisual feed.

Referring now to FIG. 8B, after the user has selected to receive an audiovisual feed from the drone 105 and/or the drone docking station 110, the remote monitor 800 may receive, using the drone application 804 on the display screen 802, the audiovisual feed 807 of the monitored space 102. The audiovisual feed 807 may display the apparent source 808, which may be the apparent source 705 unidentified by the acoustic monitoring system 700. Additionally, the graphical user interface of the drone application 804 may include control inputs for the user of the remote monitor 800 to control the drone 105. For example, the user of the remote monitor 800 may have an option to have the drone 105 follow the apparent source 705/808 as indicated by a graphical user interface button 810. Otherwise, the user of the remote monitor 800 may have an option to dismiss the apparent source 808 as an apparent source 808 to be added to the whitelist and return to the drone docking station 110, or an option to have the drone 105 follow the apparent source 705/808 as indicated by graphical user interface button 812, which, if selected, may be a characterization to not have the apparent source 705/808 and associated audio signal added to the whitelist.

Referring now to FIG. 8C, the remote monitor 800 may receive inputs from the user using the drone application 804 on the display screen 802 characterizations of the apparent source 705/808 and/or the audio signal provided by the apparent source 705/808. For example, as illustrated by graphical display 814 of the remote monitor 800, the user characterized the apparent source 808 as a "night ninja." The remote monitor 800 may provide the characterization to the drone 105, drone docking station 110, and/or service platform 130 such that the acoustic repository may be updated using the characterization.

Thus, systems and methods have been described that provide for monitoring a space based on acoustic energy within the monitored space using a drone. An acoustic monitoring system may monitor a space for acoustic energy and upon receiving acoustic energy and capturing the acoustic energy as an audio signal, computationally process the audio signal, and determine whether the captured audio signal has substantial correspondence with an acoustic profile of a whitelist. If the audio signal substantially corresponds with an acoustic profile of the whitelist, the acoustic monitoring system may ignore the acoustic energy and continue to monitor the space for additional acoustic energy. If the audio signal lacks substantial correspondence with an acoustic profile of the whitelist, then a drone of the acoustic monitoring system may dispatch and autonomously navigate to an apparent position of the apparent source that provided the acoustic energy. While in-flight, the drone may do additional processing of other captured audio signals received while in-flight and may initiate an investigate mode when the drone arrives at the apparent position of the apparent source. The investigate mode may include providing a notification that includes data of the monitored space through a communication network to a remote monitor such that a user of the remote monitor provides a characterization of the apparent source and control instructions for the drone. The acoustic monitoring system described herein improves the drone's autonomous mobility through the use of acoustic energy within the monitored space. The drone may navigate itself based on what it 'hears' which provides a light weight and energy efficient drone, enhanced autonomous controls, reduction in response time to initiate an action or alert, and controls for use in low-visibility situations when compared to drones that have autonomous capabilities based on visual data alone.

Figure 9:
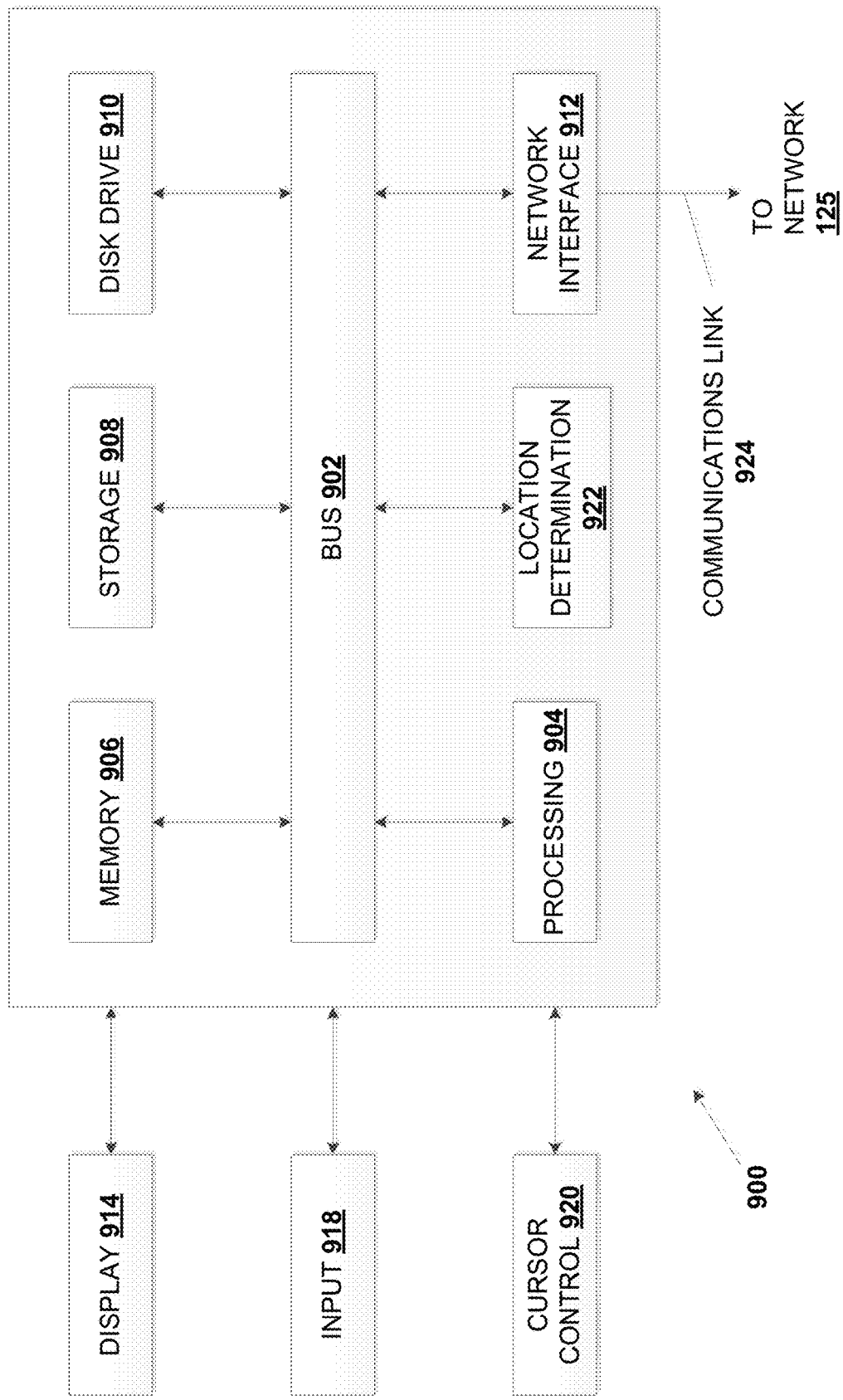
FIG. 9 is a schematic view illustrating an embodiment of a computer system.

Referring now to FIG. 9, an embodiment of a computer system 900 suitable for implementing, for example, the control of the drones 105 and/or 200, the drone docking stations 110 and/or 300, the remote monitor 120, 500, and/or 800 and the service platforms 130 and/or 400, is illustrated. It should be appreciated that other devices utilized in the acoustic monitoring system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices.) In one implementation, the disk drive component 910 may comprise a database having one or more disk drive components.

In accordance with embodiments of the present disclosure, the computer system 900 performs specific operations by the processing component 904 executing one or more sequences of instructions contained in the system memory component 906, such as described herein with respect to the drone(s), the drone docking station(s), the service platform, and/or the remote monitor(s). Such instructions may be read into the system memory component 906 from another computer-readable medium, such as the static storage component 908 or the disk drive component 910. In other embodiments, hardwired circuitry may be used in place of or in combination with software instructions to implement the present disclosure.

Logic may be encoded in a computer-readable medium, which may refer to any medium that participates in providing instructions to the processing component 904 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 910, volatile media includes dynamic memory, such as the system memory component 906, and tangible media employed incident to a transmission includes coaxial cables, copper wire, and fiber optics, including wires that comprise the bus 902 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to a communication network 125 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (e.g., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
   determining, by an unmanned vehicle comprising a processor, whether an acoustic signal satisfies a signal criterion; and
   in response to determining that the acoustic signal satisfies the signal criterion, initiating, by the unmanned vehicle, autonomous navigation of the unmanned vehicle, wherein the signal criterion comprises a standby criterion that defines whether the autonomous navigation of the unmanned vehicle is to be in a standby mode, and wherein being in the standby mode comprises staying, by the unmanned vehicle, at a defined location specified for being in the standby mode.

2. The method of claim 1, wherein the signal criterion further comprises a dispatch criterion that defines whether the unmanned vehicle is to be dispatched, and wherein initiating the autonomous navigation comprises initiating the autonomous navigation with respect to a location of a source of the acoustic signal.

3. The method of claim 1, wherein the signal criterion further comprises an investigative criterion that defines whether the autonomous navigation of the unmanned vehicle is to be in an investigate mode, and wherein being in the investigate mode comprises navigating, by the unmanned vehicle, according to the autonomous navigation to capture information with respect to an approximate location of an acoustic signal source of the acoustic signal.

4. The method of claim 3, wherein determining whether the acoustic signal satisfies the investigative criterion comprises determining, by the unmanned vehicle, whether an acoustic profile determined for the acoustic signal matches any of a group of acoustic profiles available to the unmanned vehicle be compared to the acoustic profile.

5. The method of claim 4, wherein the group of acoustic profiles comprises a whitelist of acoustic profiles, and wherein determining that the acoustic signal satisfies the investigative criterion comprises determining that the acoustic profile does not threshold correlate to any of the acoustic profiles of the whitelist.

6. The method of claim 4, wherein the group of acoustic profiles comprises a blacklist of acoustic profiles, and wherein determining that the acoustic signal satisfies the investigative criterion comprises determining that the acoustic profile threshold correlates to a profile of the acoustic profiles of the blacklist.

7. The method of claim 3, wherein the acoustic signal comprises a first acoustic signal received from the acoustic signal source, and wherein the method further comprises:
    determining, by the unmanned vehicle, whether a second acoustic signal received from the acoustic signal source satisfies a standby criterion that defines whether the autonomous navigation of the unmanned vehicle is to be in a standby mode, wherein being in the standby mode comprises maintaining, by the unmanned vehicle, a location for the unmanned vehicle specified for being in the standby mode; and
    in response to determining that the second acoustic signal satisfies the standby criterion, modifying, by the unmanned vehicle, the autonomous navigation from the investigate mode to a standby mode.

8. The method of claim 1, further comprising:
    updating, by the unmanned vehicle, the signal criterion in response to receiving a characterization from external equipment that does not comprise the unmanned vehicle.

9. The method of claim 1, wherein, after being initiated, the autonomous navigation comprises moving, by the unmanned vehicle, toward a source of the acoustic signal using a camera of the unmanned vehicle.

10. The method of claim 1, further comprising:
    in response to an input comprising an instruction applicable to the unmanned vehicle, received at a remote device and relayed to the unmanned vehicle, executing, by the unmanned vehicle, an action corresponding to the instruction.

11. A drone, comprising:
    a processor; and
    a memory that stores executable instructions that, when executed by the processor, facilitate performance of operations, comprising:
        determining whether an audio signal of audio signals, generated by a directionally-discriminating acoustic sensor using acoustic energy received by the directionally-discriminating acoustic sensor, satisfies a dispatch criterion;
        in response to the dispatch criterion being determined to be satisfied by the audio signal, navigating toward an estimated position of a source of the acoustic energy;
        during the navigating, initiating an investigate mode of the drone relating to an investigation of the source by the drone;
        in response to receiving an input signal while in the investigate mode, performing a navigation action based on the input signal; and
        determining whether an acoustic profile, determined based on the audio signal, corresponds to any acoustic profile of a defined group of acoustic profiles, accessible to the drone and determined based on a defined group of audio signals for the drone to recognize, wherein navigating toward the estimated position is in response to the acoustic profile being determined to correspond to at least one of the defined group of acoustic profiles.

12. The drone of claim 11, wherein receiving the input signal comprises receiving the input signal from remote monitoring equipment.

13. The drone of claim 11, wherein initiating the investigate mode comprises generating a feed comprising content captured by the drone associated with the investigation of the source.

14. The drone of claim 11, wherein the audio signal is a first audio signal of the audio signals, and wherein initiating the investigate mode comprises initiating the investigate mode in response to a second audio signal of the audio signals being determined to satisfy an investigation criterion relating to performance of the investigation of the source by the drone.

15. A non-transitory machine-readable medium, comprising executable instructions that, when executed by a processor, facilitate performance of operations, comprising:
    moving an unmanned aerial vehicle toward a first source of first acoustic energy; and
    in response to receiving a signal comprising a second source of second acoustic energy that is determined to satisfy a navigational change condition applicable to the unmanned aerial vehicle, moving the unmanned aerial vehicle toward the second source of the second acoustic energy.

16. The non-transitory machine-readable medium of claim 15, wherein the operations further comprise:
    in response to determining that a first priority associated with the first acoustic energy represents a higher priority than a second priority associated with the second acoustic energy, moving the unmanned aerial vehicle toward the second source after reaching the first source as part of the moving toward the first source.

17. The non-transitory machine-readable medium of claim 15, wherein the operations further comprise:
    in response to determining that a first priority associated with the first acoustic energy represents a lower priority than a second priority associated with the second acoustic energy, interrupting the moving toward to the first source, moving the unmanned aerial vehicle toward the second source, and after reaching the second source as part of the moving toward to the second source, resuming the moving toward to the first source.

18. The non-transitory machine-readable medium of claim 15, wherein the operations further comprise:

in response to an input comprising an instruction applicable to the unmanned aerial vehicle, received at a remote monitoring device and relayed to the unmanned aerial vehicle, performing, an action corresponding to the instruction.

19. The non-transitory machine-readable medium of claim 15, wherein moving the unmanned aerial vehicle toward the first source of first acoustic energy comprises moving the unmanned aerial vehicle toward the first source of first acoustic energy in response the first acoustic energy being determined to satisfy a dispatch criterion that defines whether the unmanned aerial vehicle is to be dispatched.

20. The non-transitory machine-readable medium of claim 15, wherein the operations further comprise:
in response a determination that a third acoustic energy satisfies a standby criterion, staying at a defined location specified for being in a standby mode associated with the standby criterion.

* * * * *